US011758405B2

(12) United States Patent
Paladugu et al.

(10) Patent No.: US 11,758,405 B2
(45) Date of Patent: Sep. 12, 2023

(54) PROXIMITY SERVICE AUTHORIZATION AND PROVISIONING

(71) Applicant: QUALCOMM Incorporated, San Diego, CA (US)

(72) Inventors: Karthika Paladugu, San Diego, CA (US); Gavin Bernard Horn, La Jolla, CA (US); Hong Cheng, Basking Ridge, NJ (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 17/088,478

(22) Filed: Nov. 3, 2020

(65) Prior Publication Data

US 2021/0136570 A1    May 6, 2021

Related U.S. Application Data

(60) Provisional application No. 62/931,131, filed on Nov. 5, 2019.

(51) Int. Cl.
*H04W 4/00* (2018.01)
*H04W 12/63* (2021.01)
(Continued)

(52) U.S. Cl.
CPC .......... *H04W 12/63* (2021.01); *H04W 8/005* (2013.01); *H04W 8/02* (2013.01); *H04W 12/08* (2013.01); *H04W 60/00* (2013.01)

(58) Field of Classification Search
CPC ....... H04W 12/63; H04W 8/005; H04W 8/02; H04W 12/08; H04W 60/00
(Continued)

(56) References Cited

U.S. PATENT DOCUMENTS

| | | | |
|---|---|---|---|
| 2019/0037448 A1* | 1/2019 | Shan | H04W 60/04 |
| 2019/0274130 A1 | 9/2019 | Cheng et al. | |

(Continued)

FOREIGN PATENT DOCUMENTS

| | | |
|---|---|---|
| EP | 3745746 A1 | 12/2020 |
| WO | 2019157961 A1 | 8/2019 |

OTHER PUBLICATIONS

International Search Report and Written Opinion—PCT/US2020/058917—ISA/EPO—dated Mar. 11, 2021.

*Primary Examiner* — Mark G. Pannell
(74) *Attorney, Agent, or Firm* — Arun Swain

(57) ABSTRACT

Aspects of the disclosure relate to mechanisms for proximity service (ProSe) authorization and provisioning. A user equipment (UE) may be configured to support ProSe communication and may indicate this capability to a radio access network (RAN) and a core network during registration of the UE. Based on the ProSe indication, the RAN may select an access and mobility management function (AMF) that supports ProSe authorization and policy provisioning and forward a registration request indicating the UE supports ProSe communication to the selected AMF. Upon authorizing the UE for ProSe operation, the AMF may transmit a registration accept message including a ProSe supported indication to the UE. The UE may then initiate a ProSe session with another UE based on the ProSe supported indication in the registration accept message.

27 Claims, 14 Drawing Sheets

(51) Int. Cl.
*H04W 8/00* (2009.01)
*H04W 12/08* (2021.01)
*H04W 8/02* (2009.01)
*H04W 60/00* (2009.01)

(58) Field of Classification Search
USPC .......................................................... 370/329
See application file for complete search history.

(56) References Cited

U.S. PATENT DOCUMENTS

| | | | |
|---|---|---|---|
| 2019/0306754 A1* | 10/2019 | Shan | H04W 8/06 |
| 2019/0313359 A1* | 10/2019 | Lee | H04W 4/40 |
| 2020/0112841 A1* | 4/2020 | Kim | H04W 4/70 |
| 2021/0029590 A1* | 1/2021 | Ying | H04W 28/24 |
| 2021/0306381 A1* | 9/2021 | Zhang | H04W 12/66 |
| 2022/0030496 A1* | 1/2022 | Ying | H04W 40/36 |
| 2022/0304085 A1* | 9/2022 | Lee | H04W 76/14 |
| 2022/0369092 A1* | 11/2022 | Lee | H04W 76/14 |

* cited by examiner

PROXIMITY SERVICE AUTHORIZATION AND PROVISIONING

CROSS-REFERENCE TO RELATED APPLICATIONS

The present Application for Patent claims priority to and the benefit of U.S. Provisional Application No. 62/931,131, titled "PROXIMITY SERVICE AUTHORIZATION AND PROVISIONING" filed Nov. 5, 2019, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to proximity service (ProSe) wireless communication.

INTRODUCTION

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

One example of a sidelink wireless communication network is a vehicle-to-everything (V2X) communication network. V2X communication involves the exchange of information not only between vehicles themselves, but also between vehicles and external systems, such as streetlights, buildings, pedestrians, and cellular communication networks. In some examples, V2X and other D2D networks may implement sidelink communication utilizing proximity service (ProSe) signaling. ProSe may offer improved scalability, manageability, privacy, security, and battery-efficiency as compared to traditional D2D technologies.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a user equipment is disclosed. The method can include transmitting a message to a radio access network. The message includes a registration request and a proximity service (ProSe) indication. The ProSe indication indicates to the radio access network and a core network serving the radio access network that the user equipment is configured to support ProSe communication. The method can further include receiving a registration accept message including a ProSe supported indication from the core network via the radio access network, and initiating a ProSe session between the user equipment and another user equipment based on the ProSe supported indication within the registration accept message.

Another example provides a user equipment (UE) in a wireless communication network. The UE includes a transceiver configured to communicate with a radio access network, a memory, and a processor coupled to the transceiver and the memory. The processor and the memory can be configured to transmit a message to a radio access network. The message includes a registration request and a proximity service (ProSe) indication. The ProSe indication indicates to the radio access network and a core network serving the radio access network that the user equipment is configured to support ProSe communication. The processor and the memory can further be configured to receive a registration accept message including a ProSe supported indication from the core network via the radio access network, and initiate a ProSe session between the user equipment and another user equipment based on the ProSe supported indication within the registration accept message.

Another example provides a method for wireless communication at a base station. The method can include receiving a message from a user equipment. The message includes a registration request and a proximity service (ProSe) indication. The ProSe indication indicates to the base station that the user equipment is configured to support ProSe communication. The method can further include selecting a core network serving node within a core network that supports ProSe authorization and policy provisioning, forwarding the registration request to the core network serving node, and forwarding a registration accept message from the core network serving node to the user equipment. The registration accept message includes a ProSe supported indication.

Another example provides a method for facilitating wireless communication at a core network serving node within a core network. The method can include receiving a registration request from a base station for a user equipment, and obtaining subscription information and context information for the user equipment. The subscription information includes proximity service (ProSe) subscription data indicating that the user equipment is configured to support ProSe communication. The method can further include transmitting a registration accept message to the user equipment. The registration accept message includes a ProSe supported indication when the user equipment is authorized for ProSe operation.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
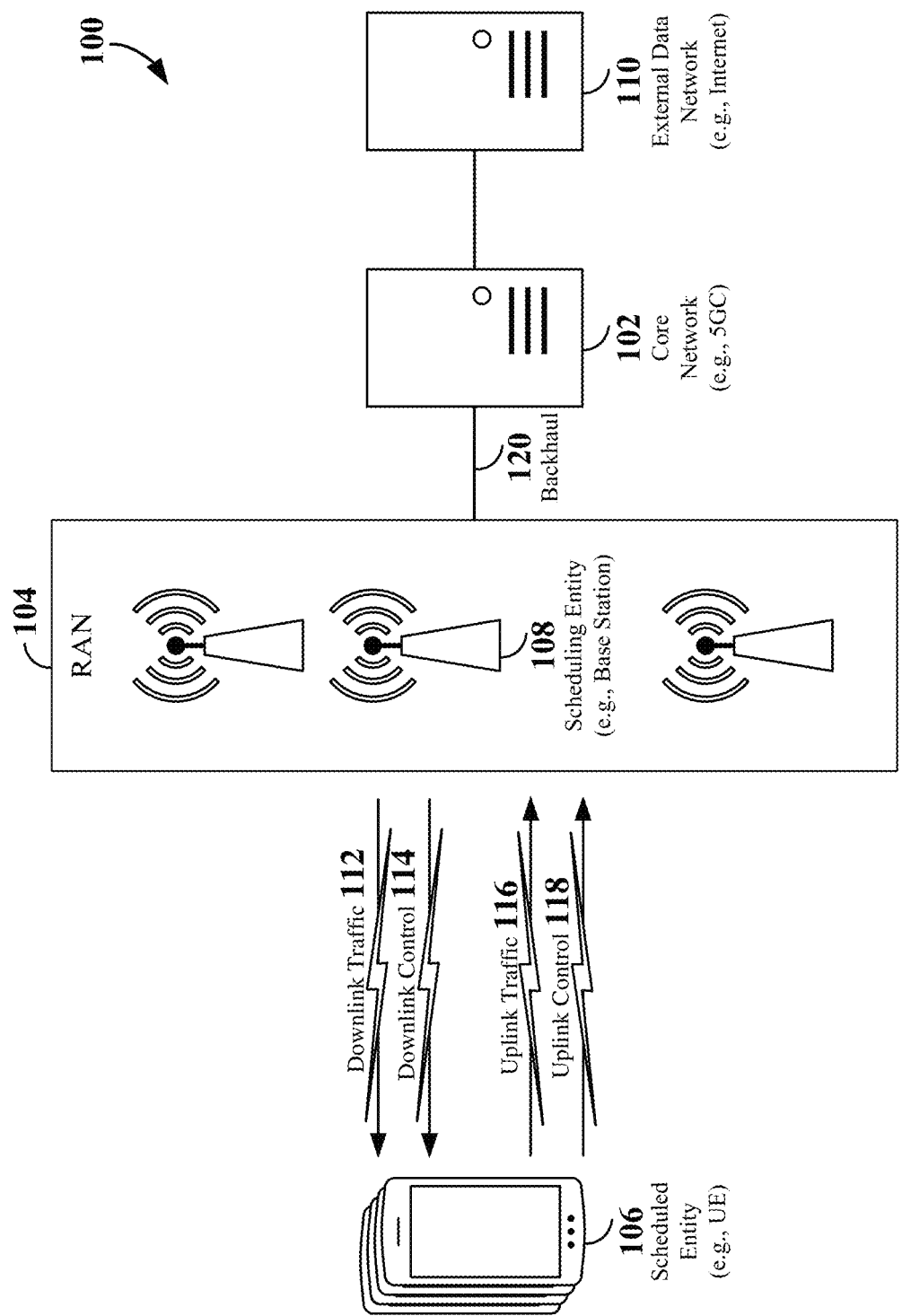
FIG. 1 is a diagram illustrating an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to mechanisms for proximity service (ProSe) authorization and provisioning in fifth generation (5G) New Radio (NR) systems. In some examples, a user equipment (UE) may be configured to support ProSe communication and may provide a ProSe indication that indicates this capability to a radio access network (RAN) and a core network during registration of the UE. For example, the UE may include the ProSe indication in a registration request message sent to the core network via the RAN. As another example, the UE may include a ProSe slice identifier indicating ProSe network slice selection assistance information (PS-NSSAI) in an access network (AN) message containing the registration request message sent to the RAN. As yet another example, the UE may include a ProSe capability indication in the AN message sent to the RAN.

In some examples, upon receiving the AN message including the registration request and ProSe indication (e.g., within the registration request or as an AN parameter of the AN message), the RAN (e.g., a base station) may be configured to select a core network serving node that supports ProSe services. In some examples, the core network serving node may be a standard access and mobility management function (AMF) within the core network that is configured to support ProSe authorization and policy provisioning or a ProSe-specific AMF within the core network that is configured to support ProSe registration and ProSe service access authorization functionality. The base station may further be configured to modify the registration request to include the PS-NSSAI and forward the modified registration request including the PS-NSSAI to the selected AMF or ProSe AMF.

Upon authorizing the UE for ProSe operation, the core network serving node (e.g., AMF or ProSe AMF) may be configured to transmit a registration accept message including a ProSe supported indication to the UE. For example, the core network serving node may be configured to obtain ProSe subscription data and context information (e.g., UE context) from unified data management (UDM) in the core network. The core network serving node may further be configured to determine whether the UE is authorized for ProSe operation, and thus, allowed to utilize ProSe services, based on the ProSe subscription data and UE context. The core network serving node may further be configured to retrieve ProSe policy information from a policy control function (PCF) in the core network and include the ProSe policy information in the registration accept message. The UE may utilize the ProSe supported indication and the ProSe policy information in initiating and establishing a ProSe session with another UE over a ProSe PC5 interface.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP) or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
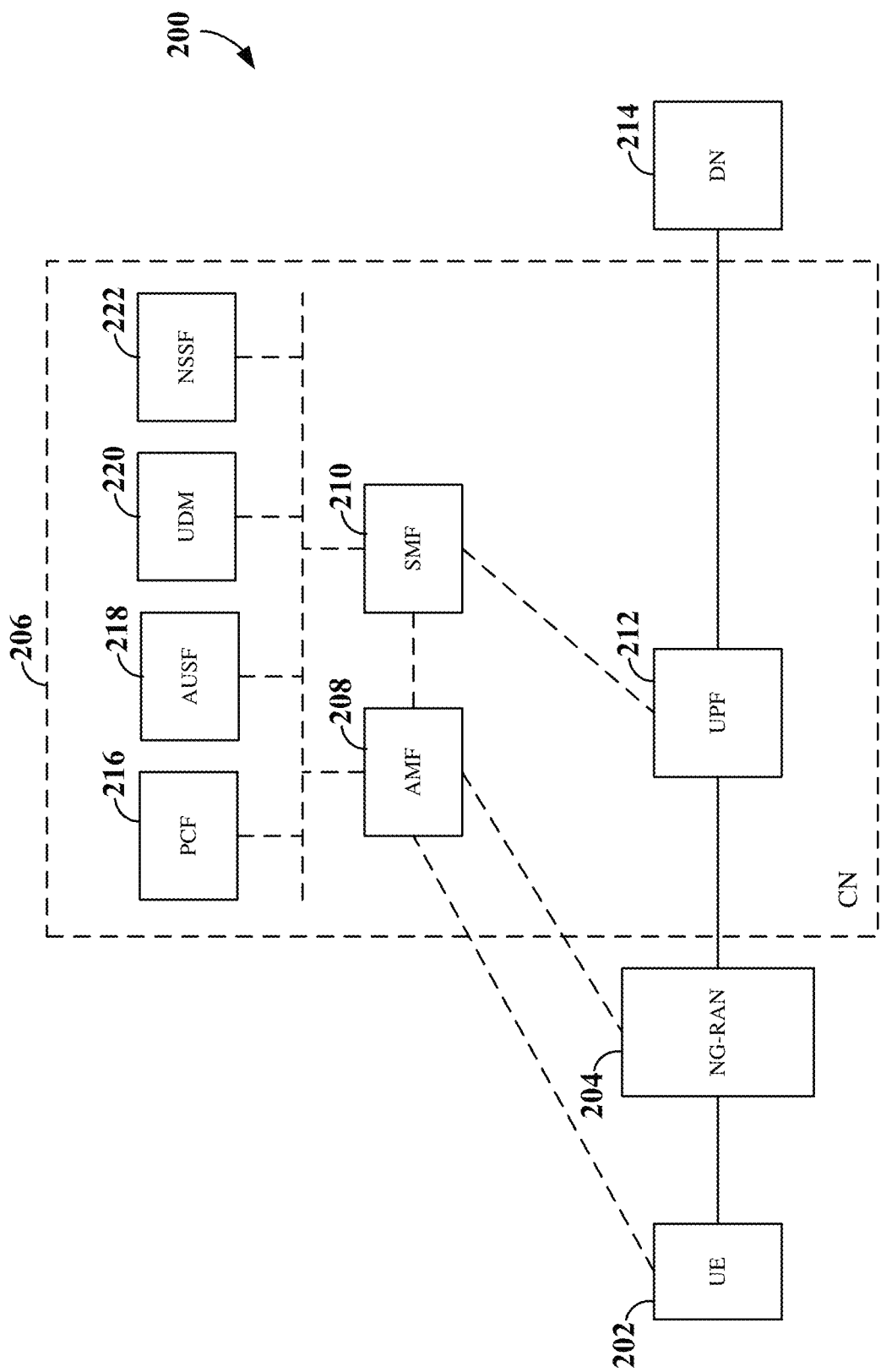
FIG. 2 is a block diagram illustrating an example of a 5G wireless communication system (5GS) according to some aspects.

Referring now to FIG. 2, by way of example and without limitation, a block diagram illustrating an example of various components of a 5G wireless communication system (5GS) 200 is provided. In some examples, the 5GS 200 may be the same wireless communication system 100 described above and illustrated in FIG. 1. The 5GS 200 includes a user equipment (UE) 202, a NR-RAN 204, and a core network 206. By virtue of the wireless communication system 200, the UE 202 may be enabled to carry out data communication with an external data network 214, such as (but not limited to) the Internet or an Ethernet network.

The core network 206 may include, for example, an access and mobility management function (AMF) 208, a session management function (SMF) 210, and a user plane function (UPF) 212. The AMF 208 and SMF 210 employ control plane (e.g., Non Access Stratum (NAS)) signaling to perform various functions related to mobility management and session management for the UE 202. For example, the AMF 208 provides connectivity, mobility management and authentication of the UE 202, while the SMF 210 provides session management of the UE 202 (e.g., processes signaling related to protocol data unit (PDU) sessions between the UE 202 and the external DN 214). The UPF 212 provides user plane connectivity to route 5G (NR) packets to/from the UE 202 via the NR-RAN 204.

The core network 206 may further include other functions, such as a policy control function (PCF) 216, authentication server function (AUSF) 218, unified data management (UDM) 220, network slice selection function (NSSF) 222, and other functions (not illustrated, for simplicity). The PCF 216 provides policy information (e.g., rules) for control plane functions, such as network slicing, roaming, and mobility management. In addition, the PCF 216 supports 5G quality of service (QoS) policies, network slice policies, and other types of policies. The AUSF 218 performs authentication of UEs 202. The UDM 220 facilitates generation of authentication and key agreement (AKA) credentials, performs user identification and manages subscription information and UE context. The NSSF 222 redirects traffic to a network slice. Network slices may be defined, for example, for different classes of subscribers or use cases, such as smart home, Internet of Things (IoT), connected car, smart energy grid, etc. Each use case may receive a unique set of optimized resources and network topology (e.g., a network slice) to meet the connectivity, speed, power, and capacity requirements of the use case.

To establish a connection to the 5G core network 206 via the NR-RAN 204, the UE 202 may transmit a registration request and PDU session establishment request to the 5G core network 206 via the NR-RAN 204. The AMF 208 and SMF 210 may process the registration request and PDU session establishment request and establish a data network session (DNS) between the UE 202 and the external DN 214 via the UPF 212. A DNS may include one or more sessions (e.g., data sessions or data flows) and may be served by multiple UPFs 212 (only one of which is shown for convenience). Examples of data flows include, but are not limited to, IP flows, Ethernet flows and unstructured data flows.

Figure 3:
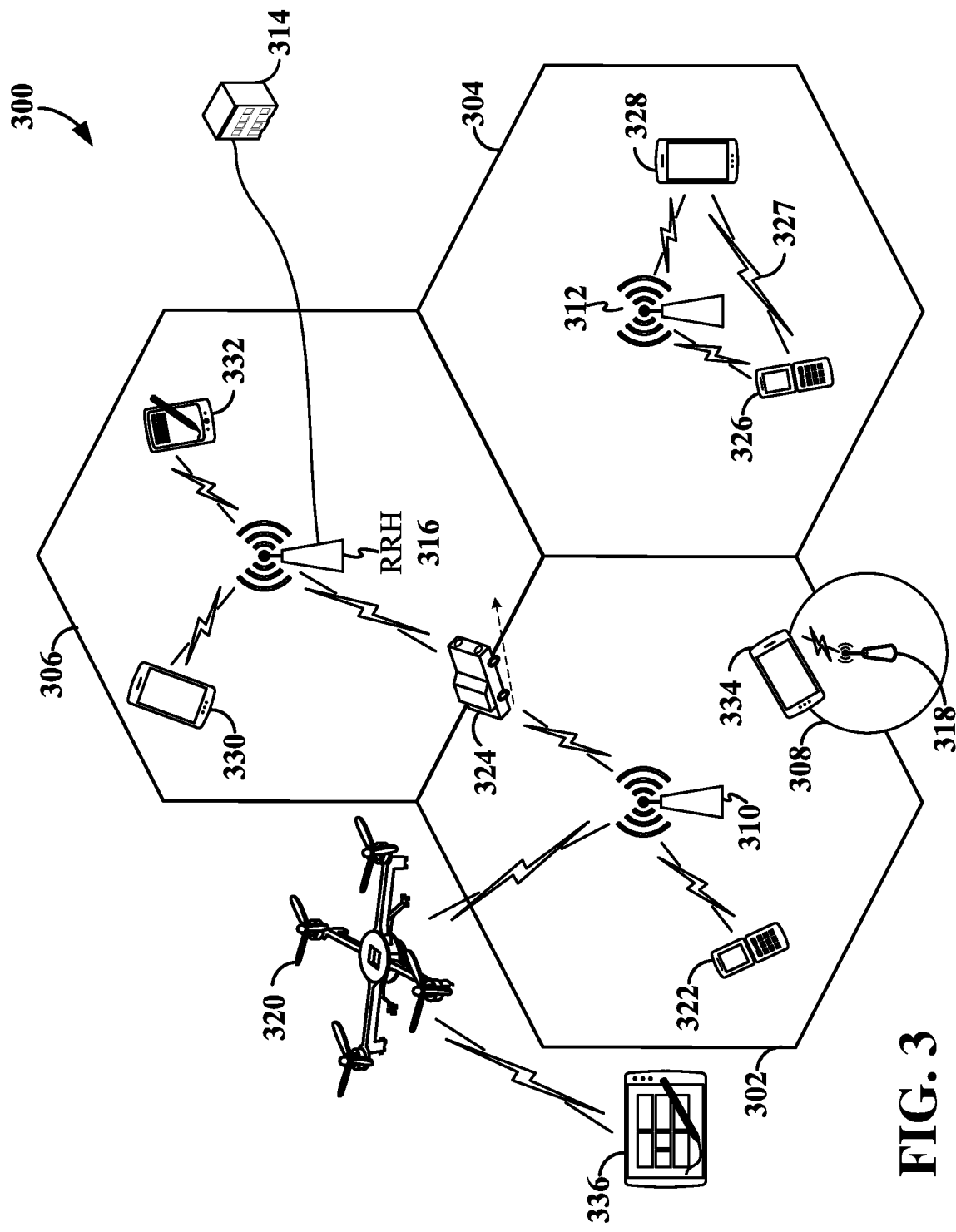
FIG. 3 is a conceptual illustration of an example of a radio access network according to some aspects.

Referring now to FIG. 3, by way of example and without limitation, a schematic illustration of a RAN 300 is provided. In some examples, the RAN 300 may be the same as the RAN 104 described above and illustrated in FIG. 1 and/or the NR-RAN 204 described above and illustrated in FIG. 2. The geographic area covered by the RAN 300 may be divided into cellular regions (cells) that can be uniquely identified by a user equipment (UE) based on an identification broadcasted from one access point or base station. FIG. 3 illustrates macrocells 302, 304, and 306, and a small cell 308, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 3, two base stations 310 and 312 are shown in cells 302 and 304; and a third base station 314 is shown controlling a remote radio head (RRH) 316 in cell 306. That is, a base station can have an integrated antenna or can be connected to an antenna or RRH by feeder cables. In the illustrated example, the cells 302, 304, and 306 may be referred to as macrocells, as the base stations 310, 312, and 314 support cells having a large size. Further, a base station 318 is shown in the small cell 308 (e.g., a microcell, picocell, femtocell, home base station, home Node B, home eNode B, etc.) which may overlap with one or more macrocells. In this example, the cell 308 may be referred to as a small cell, as the base station 318 supports a cell having a relatively small size. Cell sizing can be done according to system design as well as component constraints.

It is to be understood that the radio access network 300 may include any number of wireless base stations and cells. Further, a relay node may be deployed to extend the size or coverage area of a given cell. The base stations 310, 312, 314, 318 provide wireless access points to a core network for any number of mobile apparatuses. In some examples, the base stations 310, 312, 314, and/or 318 may be the same as the base station/scheduling entity 108 described above and illustrated in FIG. 1.

Within the RAN 300, the cells may include UEs that may be in communication with one or more sectors of each cell. Further, each base station 310, 312, 314, and 318 may be configured to provide an access point to a core network (e.g., as illustrated in FIG. 1 and/or 2) for all the UEs in the respective cells. For example, UEs 322 and 324 may be in communication with base station 310; UEs 326 and 328 may be in communication with base station 312; UEs 330 and 332 may be in communication with base station 314 by way of RRH 316; and UE 334 may be in communication with base station 318. In some examples, the UEs 322, 324, 326, 328, 330, 332, 334, 338, 340, and/or 342 may be the same as the UE/scheduled entity 106 described above and illustrated in FIG. 1 and/or the UE 202 described above and illustrated in FIG. 2. The various physical channels between a UE and the RAN are generally set up, maintained, and released under the control of the AMF 208, illustrated in FIG. 2.

In some examples, an unmanned aerial vehicle (UAV) 320, which may be a drone or quadcopter, can be a mobile network node and may be configured to function as a UE. For example, the UAV 320 may operate within cell 302 by communicating with base station 310.

In the RAN 300, the ability for a UE to communicate while moving, independent of its location, is referred to as mobility. The RAN 300 may enable mobility of a UE by facilitating handovers (i.e., the transfer of a UE's connection from one radio channel to another) between cells. For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 324 (illustrated as a vehicle, although any suitable form of UE may be used) may move from the geographic area corresponding to its serving cell 302 to the geographic area corresponding to a neighbor cell 306. When the signal strength or quality from the neighbor cell 306 exceeds that of its serving cell 302 for a given amount of time, the UE 324 may transmit a reporting message to its serving base station 310 indicating this condition. In response, the UE 324 may receive a handover command, and the UE may undergo a handover to the cell 306.

In various implementations, the air interface in the radio access network 300 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 300 may utilize one or more multiplexing and multiple access algorithms to enable simultaneous communication of the various devices. For example, 5G NR specifications provide multiple access for UL transmissions from UEs 322 and 324 to base station 310, and for multiplexing for DL transmissions from base station 310 to one or more UEs 322 and 324, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 310 to UEs 322 and 324 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 300 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In a further aspect of the RAN 300, sidelink or device-to-device (D2D) signals 327 may be communicated directly between UEs on resources allocated by a base station 312 for sidelink or D2D communication. In some examples, the sidelink or D2D signals 327 include one or more of sidelink/D2D traffic and sidelink/D2D control. For example, two or more UEs (e.g., UEs 326 and 328) may communicate with each other using D2D or sidelink signals 327 without relaying that communication through a base station (e.g., base station 312). In this example, a UE may function as a scheduling entity to schedule D2D or sidelink signals 327 on the network-allocated resources in a D2D, vehicle-to-vehicle (V2V), or vehicle-to-everything (V2X) network. Thus, in a wireless communication system with scheduled access to time-frequency resources and having a cellular configuration, a scheduling entity (e.g., a UE 326) and one or more scheduled entities (e.g., one or more other UEs 328) may directly communicate with one another utilizing the resources allocated by the cellular network (e.g., base station 312) for D2D or sidelink communication.

Figure 4:
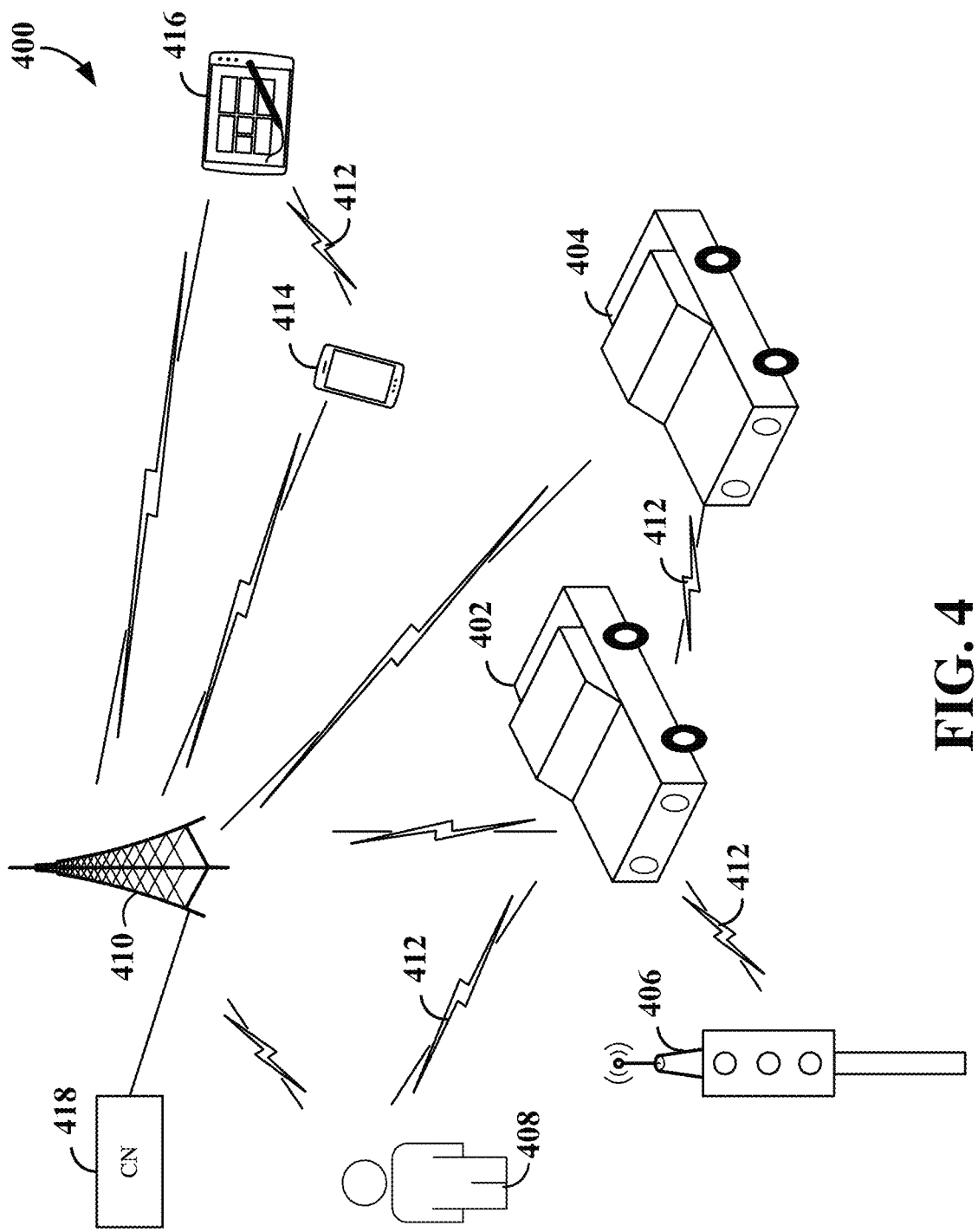
FIG. 4 is a diagram illustrating an example of a 5GS configured to support sidelink and proximity service (ProSe) communication according to some aspects.

FIG. 4 illustrates an example of a 5GS 400 configured to support D2D or sidelink communication. In some examples, sidelink communication may include V2X communication. V2X communication involves the wireless exchange of information directly between not only vehicle UEs (e.g., vehicle UEs 402 and 404) themselves, but also directly between vehicle UEs 402/404 and infrastructure (e.g., roadside unit (RSU) UEs (R-UEs) 406), such as streetlights, buildings, traffic cameras, tollbooths or other stationary objects, vehicle UEs 402/404 and pedestrian UEs 408, and vehicle UEs 402/404 and radio access networks (e.g., base station 410). In some examples, V2X communication may be implemented in accordance with the New Radio (NR) cellular V2X standard defined by 3GPP, Release 15, or other suitable standard.

V2X communication enable vehicle UEs 402 and 404 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle UE 402 and 404 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist (e.g., P-UE 408) may be utilized to trigger a warning sound, vibration, flashing light, etc., in case of imminent danger.

The sidelink communication between vehicle UEs 402 and 404 or between a vehicle UE 402 or 404 and either R-UE 406 or a P-UE 408 may occur over a proximity service (ProSe) PC5 interface 412. In various aspects of the disclosure, the PC5 interface 412 may further be utilized to support D2D communication in other proximity use cases. Examples of other proximity use cases may include public safety or commercial (e.g., entertainment, education, office, medical, and/or interactive) based proximity services. In the example shown in FIG. 4, ProSe D2D communication may occur between UEs 414 and 416.

ProSe communication may support different operational scenarios, such as in-coverage, out-of-coverage, and partial coverage. Out-of-coverage refers to a scenario in which UEs (e.g., V-UEs 402 and 404 or UEs 414 and 416) are outside of the coverage area of a base station (e.g., base station 410), but each are still configured for ProSe communication. Partial coverage refers to a scenario in which at least one of the UEs (e.g., V-UE 404) is outside of the coverage area of a base station (e.g., base station 410), while one or more other UEs (e.g., V-UE 402 and P-UE 408) are in communication with the base station 410. In-coverage refers to a scenario in which UEs (e.g., UEs 414 and 416) are in communication with the base station 410 (e.g., gNB) via a Uu (e.g., air interface) connection to receive ProSe service authorization and provisioning information to support ProSe operations. To facilitate ProSe authorization and policy provisioning in ProSe use cases, each UE 414 and 416 may be configured to indicate to the base station 410 and a core network 418 serving the base station 410 that the UE 414/416 supports ProSe communication over the PC5 interface 412.

Figure 5:
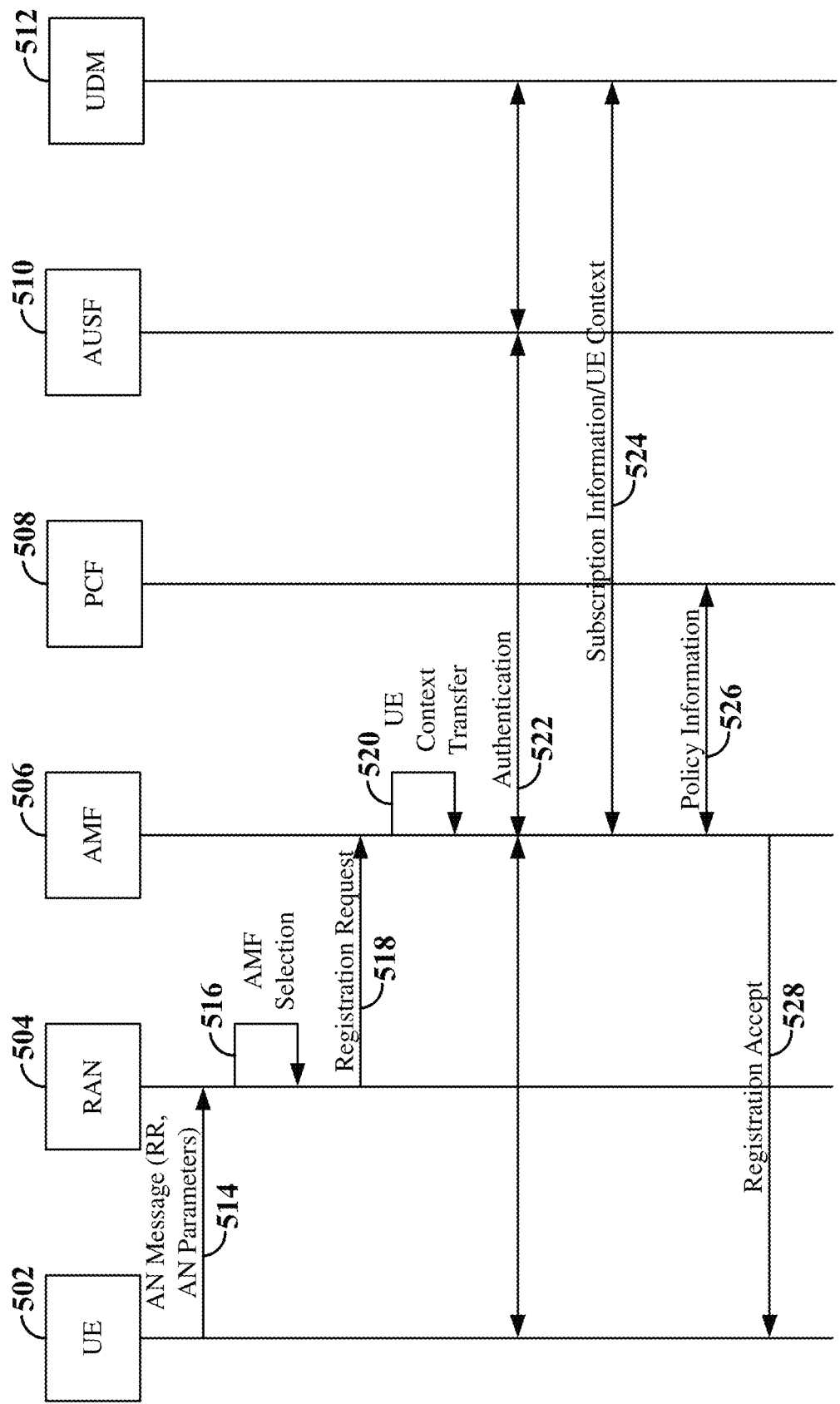
FIG. 5 is a signaling diagram illustrating an exemplary flow for supporting UE registration for ProSe services according to some aspects.

FIG. 5 is a signaling diagram illustrating an exemplary flow for supporting UE 502 registration with a core network via a radio access network (RAN) 504 for ProSe services in proximity use cases. The UE 502 may correspond, for example, to any of the UEs shown in FIGS. 1-4, including any of the V2X UEs (e.g., V-UE, P-UE, R-UE, etc.). In addition, the RAN 504 may include one or more of the base stations (e.g., eNBs or gNBs) shown in FIGS. 1-4. In the example shown in FIG. 5, the core network includes an AMF 506, PCF, 508, AUSF 510, and UDM 512. Each of the AMF 506, PCF 508, AUSF 510, and UDM 512 may correspond, for example, to the corresponding nodes illustrated in FIG. 2. In some examples, the AMF 506 is a ProSe AMF configured to support registration for ProSe services and provide ProSe service access authorization functionality.

At 514, the UE 502 transmits an access network (AN) message to the RAN 504.

The AN message includes a registration request (RR) and a ProSe indication that the UE 502 supports ProSe communication. In some examples, the ProSe indication may be included within the RR to indicate to the RAN 504 and the core network that the UE 502 is configured to support ProSe communication for proximity use services. In other examples, the ProSe indication that the UE 502 supports ProSe communication may be included within one or more AN parameters of the AN message. For example, the AN parameters may include a ProSe capability indication that indicates to the RAN 504 that the UE 502 is configured to support ProSe communication for proximity use services. In still other examples, the AN parameters may include a ProSe slice identifier that indicates to the RAN 504 that the UE 502 is configured to support ProSe communication for proximity use services. For example, the ProSe slice identifier may include ProSe network slice selection assistance information (PS-NSSAI).

At 516, the RAN 504 selects an AMF 506 based on the ProSe indication included in the AN message (e.g., within the RR or as an AN parameter of the AN message). In some examples, the RAN 504 may select an AMF 506 that supports ProSe authorization and policy provisioning. In other examples, the RAN 504 may select a specific type of AMF 506 (e.g., a ProSe AMF 506) that is configured for ProSe registration and supports ProSe service access authorization functionality.

At 518, the RAN 504 transmits the RR to the selected AMF 506. In some examples, the RAN 504 may modify the RR to include the PS-NSSAI and transmit the modified RR including the PS-NSSAI to the selected AMF 506. At 520, the AMF 506 transfers the UE context of the UE 502 from the old AMF (not shown) previously serving the UE 502 to the new AMF 506. In some examples, the UE context may include ProSe session management function (SMF) information. For example, when the PS-NSSAI or ProSe supported indication is included in the RR, the AMF 506 may request transfer of ProSe SMF information from the old AMF.

At 522, the AMF 506 may perform authentication of the UE 502. In some examples, the AMF 506 may select the AUSF 510 and request authentication of the UE from the AUSF 510. In some examples, the AUSF 510 may retrieve authentication data for the UE 502 from the UDM 512. Once the UE 502 has been authenticated, the AUSF 510 may provide security information to the AMF 506. The AMF 506 may then indicate to the UE 502 that the UE is validated.

At 524, the AMF 506 retrieves subscription information (e.g., access and mobility subscription data and/or SMF selection subscription data) and may further retrieve the UE context from the UDM 512. In some examples, the subscription information may include ProSe subscription data. For example, the ProSe subscription data may include whether the UE 502 is authorized for ProSe operation, and therefore, allowed to utilize ProSe services, such as PS-NSSAI services. At 526, the AMF 506 may retrieve policy information for the UE 502 from the PCF 508. In some examples, the policy information may include ProSe policy information.

At 528, the AMF 506 transmits a registration accept message to the UE 502 via the RAN 504. In some examples, the AMF 506 may determine whether the UE 502 is authorized for ProSe operation based on the ProSe subscription data and UE context. When the UE 502 is authorized for ProSe operation, the registration accept message may include a ProSe supported indication to indicate to the UE 502 that the UE 502 may utilize ProSe services (e.g., initiate one or more ProSe sessions with other UEs). In addition, the registration accept message may further include ProSe policy information for use by the UE 502 in establishing one or more ProSe sessions.

Figure 6:
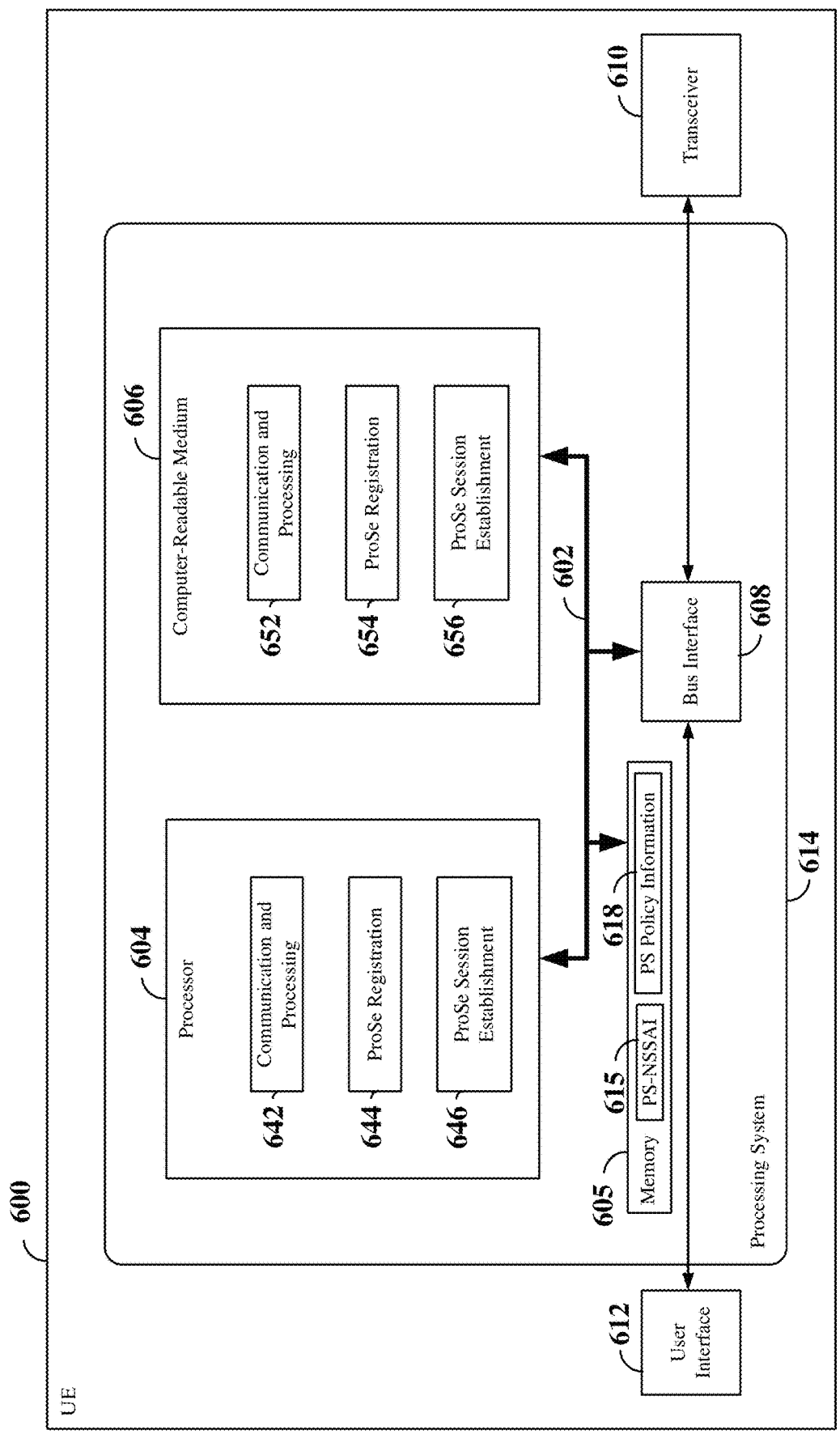
FIG. 6 is a diagram illustrating an example of a hardware implementation for a user equipment employing a processing system according to some aspects.

FIG. 6 is a block diagram illustrating an example of a hardware implementation for a user equipment (UE) 600 employing a processing system 614. For example, the UE 600 may correspond to any of the UEs shown and described above in reference to FIGS. 1-5.

The UE 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 600 may be configured to perform any one or more of the functions described herein. That is, the processor 604, as utilized in the UE 600, may be used to implement any one or more of the processes and procedures described below.

In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further.

A bus interface 608 provides an interface between the bus 602 and a transceiver 610. The transceiver 610 provides a means for communicating with various other apparatus over a transmission medium (e.g., air interface). Depending upon the nature of the apparatus, a user interface 612 (e.g., keypad, display, touch screen, speaker, microphone, control knobs, etc.) may also be provided. Of course, such a user interface 612 is optional, and may be omitted in some examples.

The processor 604 is responsible for managing the bus 602 and general processing, including the execution of software stored on the computer-readable medium 606. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 604, causes the processing system 614 to perform the various functions described below for any particular apparatus. The computer-readable medium 606 and the memory 605 may also be used for storing data that is manipulated by the processor 604 when executing software.

The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. In some examples, the computer-readable medium 606 may be part of the memory 605. Those skilled in the art will recognize how best to implement the described functionality presented throughout this disclosure depending on the particular application and the overall design constraints imposed on the overall system.

In some aspects of the disclosure, the processor 604 may include circuitry configured for various functions. For example, the processor 604 may include communication and processing circuitry 642 configured to communicate with a base station (e.g., scheduling entity) via downlink and uplink signals and further configured to communicate with one or more other UEs via ProSe signals. For example, the communication and processing circuitry 642 may be configured to exchange ProSe control information and ProSe data with other UEs via the transceiver 610. As another example, the communication and processing circuitry 642 may be configured to generate and transmit uplink user data traffic and uplink control channels within one or more subframes, slots, and/or mini-slots to the base station. In addition, the communication and processing circuitry 642 may be configured to receive downlink user data traffic and downlink control channels within one or more subframes, slots, and/or mini-slots from the base station. The communication and processing circuitry 642 may include one or more hardware components that provide the physical structure that performs processes related to wireless communication (e.g., signal reception and/or signal transmission) and signal processing (e.g., processing a received signal and/or processing a signal for transmission). The communication and processing circuitry 642 may further be configured to execute communication and processing software 652 stored on the computer-readable medium 606 to implement one or more functions described herein.

The processor 604 may further include ProSe registration circuitry 644, configured to operate together with the communication and processing circuitry 642 to generate and transmit a message (e.g., an AN message) to the RAN (e.g., base station) serving the UE 600 to register with the core network. The AN message includes a registration request and a ProSe indication that indicates that the UE 600 supports ProSe communication. In some examples, the ProSe indication is included in the registration request to indicate to the base station and the core network that the UE 600 is configured to support ProSe communication for proximity use services. In other examples, the ProSe indication may be included within one or more AN parameters of the AN message. For example, the AN parameters may include a ProSe capability indication that indicates to the base station that the UE 600 is configured to support ProSe communication for proximity use services. In still other examples, the AN parameters may include a ProSe slice identifier that indicates to the base station that the UE 600 is configured to support ProSe communication for proximity use services. For example, the ProSe slice identifier may include ProSe network slice selection assistance information (PS-NSSAI) 615. The PS-NSSAI 615 may be maintained, for example, in memory 605 for use by the ProSe registration circuitry 644.

The ProSe registration circuitry 644 may further be configured to operate together with the communication and processing circuitry 642 to receive and process a registration accept message. In some examples, the registration accept message includes a ProSe supported indication when the core network has authorized the UE 600 for ProSe operation. The registration accept message may further include ProSe policy information (PS policy information 618) for use in initiating one or more ProSe sessions. The ProSe registration circuitry 644 may further be configured to execute ProSe registration software 654 stored on the computer-readable medium 606 to implement one or more functions described herein.

The processor 604 may further include ProSe session establishment circuitry 646, configured to establish one or more ProSe sessions with other UEs. In some examples, the ProSe session establishment circuitry 646 may be configured to initiate and establish a ProSe with another UE upon receiving the ProSe supported indication within the registration accept message from the core network. In some examples, the ProSe session establishment circuitry 646 may be configured to initiate and establish a ProSe session based on the PS policy information 618 included in the registration accept message.

In some examples, the ProSe session establishment circuitry 646 may be configured to discover another UE (e.g., using a peer discovery procedure) and establish a radio resource control (RRC) connection and signaling radio bearer (SRB) for a ProSe session with the other UE. A SRB is a logical communication channel on L2 and higher layers for the transfer of control information for a communication session. For example, the SRB may carry a dedicated control channel (DCCH) including physical (PHY) layer, medium access control (MAC) layer, and other access layer control information to initiate the communication session. Using the SRB, the configuration of the L2 and higher protocol layers is of a semi-static nature that occurs during set-up of the communication session. PHY layer control is more dynamic in nature based on resource allocation (e.g., time, frequency, space, and/or power), and thus, PHY layer control and adaption typically occur at the time that data is being exchanged (e.g., transmitted/received). The SRB may further establish one or more data radio bearers (DRBs) for the communication session. A data radio bearer is a logical communication on L2 and higher layers for the transfer of data for the communication session. For example, a DRB carries dedicated traffic channel (DTCH) data for a communication session. A DRB may be established using a radio bearer (RB) setup procedure on the SRB.

Once the ProSe session is established by the ProSe session establishment circuitry 646, the communication and processing circuitry 642 may be configured to reserve resources (e.g., time-frequency resources) for the transmission of one or more data packets to the other UE (or a group of UEs in a groupcast ProSe session). The communication and processing circuitry 642 may then be configured to transmit a physical sidelink control channel (PSSCH) including downlink control information (DCI) indicating scheduled resources within the reserved resources for the transmission of a data packet within a physical sidelink shared channel (PSSCH). The ProSe session establishment circuitry 646 may further be configured to execute ProSe establishment software 656 stored on the computer-readable medium 606 to implement one or more functions described herein.

Figure 7:
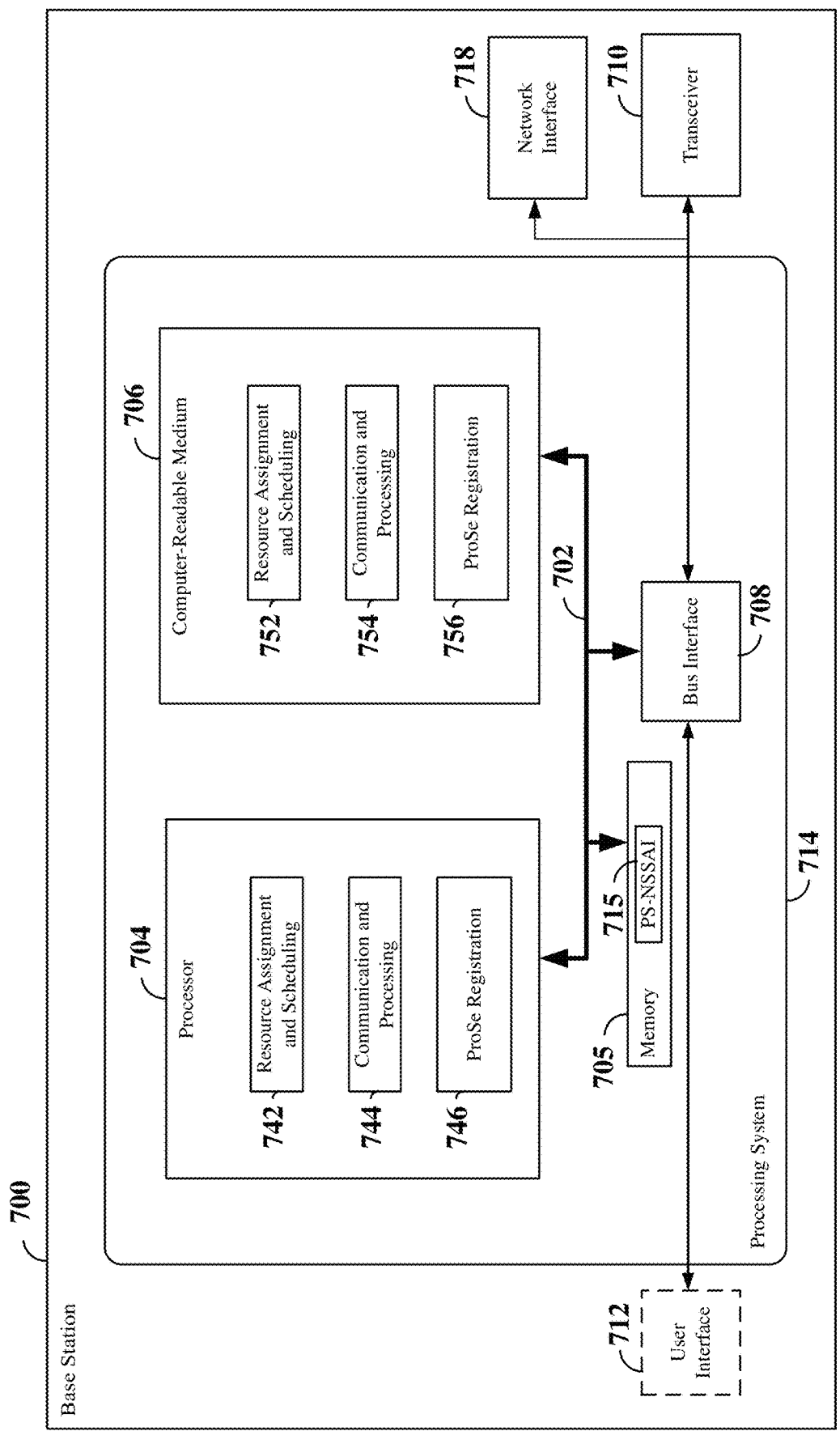
FIG. 7 is a diagram illustrating an example of a hardware implementation for a base station employing a processing system according to some aspects.

FIG. 7 is a conceptual diagram illustrating an example of a hardware implementation for an exemplary base station 700 employing a processing system 714. For example, the base station 700 may be a base station as illustrated in any one or more of FIGS. 1-5.

In accordance with various aspects of the disclosure, an element, or any portion of an element, or any combination of elements may be implemented with a processing system 714 that includes one or more processors 704. That is, the processor 704, as utilized in a base station 700, may be used to implement any one or more of the processes described below. The processing system 714 may be substantially the same as the processing system 614 illustrated in FIG. 6, including a bus interface 708, a bus 702, memory 705, a processor 704, and a computer-readable medium 706. Furthermore, the base station 700 may include an optional user interface 712 and a transceiver 710 substantially similar to those described above in FIG. 6. In addition, the base station 700 may include an interface 718 (e.g., a network interface) that provides a means for communicating with various other apparatus within a core network and within one or more radio access networks.

In some aspects of the disclosure, the processor 704 may include resource assignment and scheduling circuitry 742, configured to generate, schedule, and modify a resource assignment or grant of time-frequency resources (e.g., a set of one or more resource elements). For example, the resource assignment and scheduling circuitry 742 may schedule time-frequency resources within a plurality of subframes, slots, and/or mini-slots to carry user data traffic and/or control information to and/or from multiple UEs (scheduled entities).

In some examples, the resource assignment and scheduling circuitry 742 may be configured to schedule resources for the transmission of an AN message from a user equipment (UE) to the base station 700. In addition, the resource assignment and scheduling circuitry 742 may further be configured to schedule resources for the transmission of a registration accept message to the UE upon successfully registering the UE with the core network. The resource assignment and scheduling circuitry 742 may further be configured to execute resource assignment and scheduling software 752 stored on the computer-readable medium 706 to implement one or more functions described herein.

The processor 704 may further include communication and processing circuitry 744, configured to communicate with one or more scheduled entities (e.g., UEs) via the transceiver 710. The communication and processing circuitry 744 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 744 may be configured to generate and transmit downlink user data traffic and downlink control channels within one or more subframes, slots, and/or mini-slots in accordance with the resources assigned to the downlink user data traffic and/or downlink control information by the resource assignment and scheduling circuitry 742. In addition, the communication and processing circuitry 744 may be configured to receive and process uplink user data traffic and uplink control channels within one or more subframes, slots, and/or mini-slots in accordance with the resources assigned to the uplink user data traffic and/or uplink control information by the resource assignment and scheduling circuitry 742.

In some examples, the communication and processing circuitry 744 may be configured to receive and process an AN message from a UE via the transceiver 710. The AN message may include a registration request and a ProSe indication that the UE supports ProSe communication. In some examples, the ProSe indication may be included within the registration request to indicate that the UE is configured to support ProSe communication for proximity use services. In other examples, the AN message may further include one or more AN parameters including the ProSe indication. For example, the AN parameters may include a ProSe capability indication that indicates that the UE is configured to support ProSe communication for proximity use services. In still other examples, the AN parameters may include a ProSe slice identifier that indicates that the UE is configured to support ProSe communication for proximity use services. For example, the ProSe slice identifier may include ProSe network slice selection assistance information (PS-NSSAI) 715. In some examples, the PS-NSSAI 715 may be stored in memory 705.

The communication and processing circuitry 744 may further be configured to forward the registration request included in the AN message to a core network serving node (e.g., an AMF or ProSe AMF) within the core network via the interface 718. In addition, the communication and processing circuitry 744 may be configured to forward a registration accept message received from the core network serving node via the interface 712 to the UE. The registration accept message may be transmitted to the UE via the transceiver 710. The communication and processing circuitry 744 may further be configured to execute communication and processing software 754 stored on the computer-readable medium 706 to implement one or more functions described herein.

The processor 704 may further include ProSe registration circuitry 746, configured to operate together with the communication and processing circuitry 744 to receive and process the AN message from the UE to facilitate the UE registering with the core network. The ProSe registration circuitry 746 may further be configured to select an AMF within the core network based on the ProSe indication included in the AN message (e.g., within the registration request or as an AN parameter of the AN message). In some examples, the ProSe registration circuitry 746 may select an AMF that supports ProSe authorization and policy provisioning. In other examples, the ProSe registration circuitry 746 may select a specific type of AMF (e.g., a ProSe AMF) that is configured for ProSe registration and supports ProSe service access authorization functionality.

The ProSe registration circuitry 746 may further be configured to modify the registration request included in the AN message to include the PS-NSSAI and to forward the modified registration request including the PS-NSSAI to the selected AMF. The ProSe registration circuitry 746 may further be configured to operate together with the communication and processing circuitry 744 to forward a registration accept message received from the selected AMF to the UE. In some examples, the registration accept message includes a ProSe supported indication when the core network (e.g., selected AMF) has authorized the UE for ProSe operation. The registration accept message may further include ProSe policy information for use by the UE in initiating one or more ProSe sessions. The ProSe registration circuitry 746 may further be configured to execute ProSe registration software 756 stored on the computer-readable medium 706 to implement one or more functions described herein.

Figure 8:
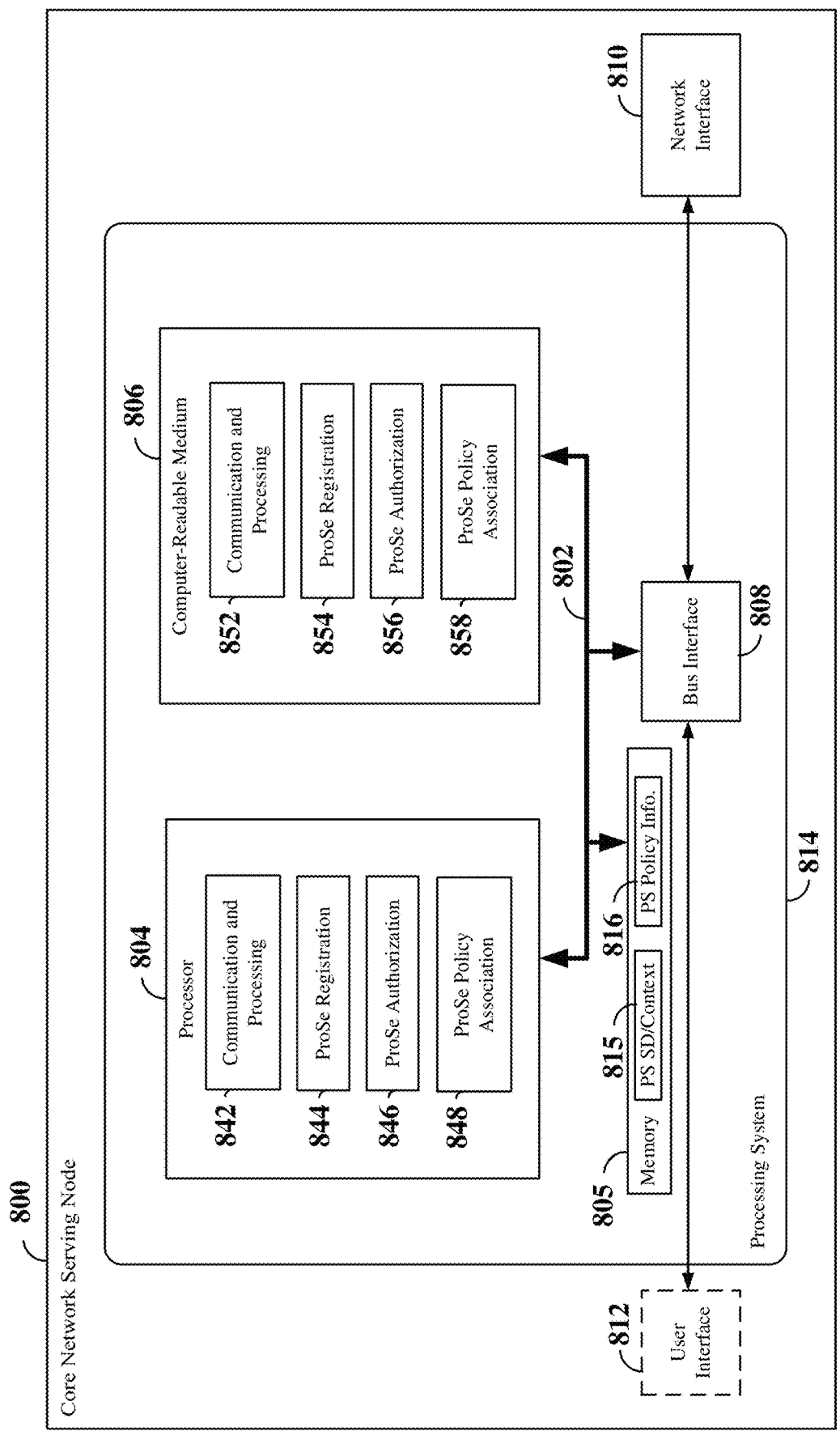
FIG. 8 is a diagram illustrating an example of a hardware implementation for a core network serving node employing a processing system according to some aspects.

FIG. 8 is a conceptual diagram illustrating an example of a hardware implementation for an exemplary core network serving node 800 employing a processing system 814. For example, the core network serving node 800 may be an AMF or ProSe AMF, as illustrated in FIGS. 2 and/or 5.

In accordance with various aspects of the disclosure, an element, or any portion of an element, or any combination of elements may be implemented with a processing system 814 that includes one or more processors 804. That is, the processor 804, as utilized in core network serving node 800, may be used to implement any one or more of the processes described below. The processing system 814 may be substantially the same as the processing system 714 illustrated in FIG. 7, including a bus interface 808, a bus 802, memory 805, a processor 804, and a computer-readable medium 806. Furthermore, the core network serving node 800 may include an optional user interface 812 and an interface 810 (e.g., a network interface) that provides a means for communicating with various other apparatus within the core network and with one or more radio access networks.

In some aspects of the disclosure, the processor 804 may include communication and processing circuitry 842. The communication and processing circuitry 842 may include one or more hardware components that provide the physical structure that performs various processes related to communication (e.g., signal reception and/or signal transmission) as described herein. The communication and processing circuitry 842 may further include one or more hardware components that provide the physical structure that performs various processes related to signal processing (e.g., processing a received signal and/or processing a signal for transmission) as described herein.

In examples in which the core network serving node 800 is an AMF or ProSe AMF, the communication and processing circuitry 842 may be configured to receive and process a registration request from a UE via a RAN (e.g., a base station) serving the UE. The communication and processing circuitry 842 may further be configured to generate and transmit a registration accept message to the UE via the RAN. The communication and processing circuitry 842 may further be configured to execute communication and processing software 852 stored on the computer-readable medium 806 to implement one or more functions described herein.

The processor 804 may further include ProSe registration circuitry 844, ProSe authorization circuitry 846, and ProSe policy association circuitry 848. The ProSe registration circuitry 844 may be configured to register the UE for ProSe operation. In some examples, the ProSe registration circuitry 844 may be configured to perform a UE context transfer from an old AMF to which the UE was previously registered. For example, the ProSe registration circuitry 844 may request the old AMF to transfer ProSe SMF information when the registration request includes either a PS-NSSAI or a ProSe supported indication that indicates that the UE supports ProSe communication.

The ProSe registration circuitry 844 may further operate together with the ProSe authorization circuitry 846 to determine whether the UE is authorized for ProSe operation. In some examples, the ProSe registration circuitry 844 may be configured to retrieve subscription information (e.g., access and mobility subscription data and/or SMF selection subscription data) for the UE and may further retrieve the UE context from a UDM in the core network. In some examples, the subscription information may include ProSe subscription data. The ProSe registration circuitry 844 may be configured to store the ProSe subscription data/UE context (SD/context) 815 within, for example, memory 805. The ProSe authorization circuitry 846 may be configured to access the ProSe SD/context 815 in memory 805 and utilize the ProSe SD/context 815 to determine whether the UE is authorized for ProSe operation, and therefore, allowed to utilize ProSe services.

The ProSe registration circuitry 844 may further operate together with the ProSe policy association circuitry 848 to retrieve policy information for the UE from the PCF in the core network. In some examples, the policy information may include ProSe policy information 816, which may be stored, for example, in memory 805. The ProSe policy association circuitry 848 may further associate the ProSe policy information 816 with the UE (e.g., the UE context). In some examples, the ProSe policy information 816 may include at least one of in-coverage ProSe policy information, out-of-coverage ProSe policy information, or partial coverage ProSe policy information.

The ProSe registration circuitry 844 may further be configured to operate together with the communication and processing circuitry 842 to generate the registration accept message for the UE upon successfully registering the UE. In some examples, the ProSe registration circuitry 844 may include a ProSe supported indication in the registration accept message when the ProSe authorization circuitry 846 determines that the UE is authorized for ProSe operation. In addition, the ProSe registration circuitry 844 may include the ProSe policy information 816 in the registration accept message.

The ProSe registration circuitry 844 may further be configured to execute ProSe registration software 854 stored on the computer-readable medium 806 to implement one or more functions described herein. In addition, the ProSe authorization circuitry 846 may further be configured to execute ProSe authorization software 856 stored on the computer-readable medium 806 to implement one or more functions described herein. Furthermore, the ProSe policy association circuitry 848 may further be configured to execute ProSe policy association software 858 stored on the computer-readable medium 806 to implement one or more functions described herein.

Figure 9:
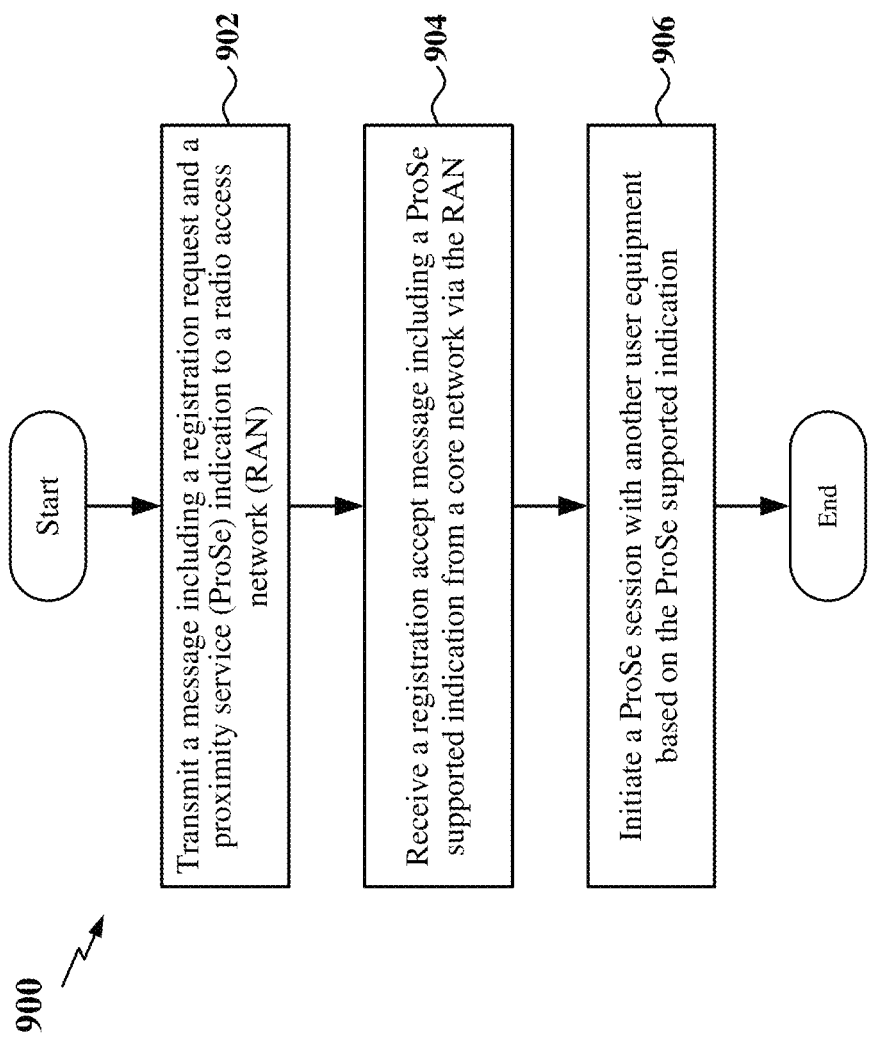
FIG. 9 is a flow chart of an exemplary method for facilitating ProSe authorization and provisioning at a user equipment according to some aspects.

FIG. 9 is a flow chart 900 of a method for facilitating ProSe authorization and provisioning at a user equipment according to some aspects. As described below, some or all illustrated features may be omitted in a particular implementation within the scope of the present disclosure, and some illustrated features may not be required for implementation of all embodiments. In some examples, the method may be performed by the UE 600, as described above and illustrated in FIG. 6, by a processor or processing system, or by any suitable means for carrying out the described functions.

At block 902, the UE may transmit a message (e.g., an AN message) including a registration request and a proximity service (ProSe) indication to a RAN (e.g., a base station serving the UE). The ProSe indication indicates to the base station that the UE is configured to support ProSe communication for proximity use services. In some examples, the registration request includes the ProSe indication. In some examples, the message further includes AN parameters including the ProSe indication. For example, the ProSe indication may include a ProSe capability indication included in the AN parameters. As another example, the ProSe indication may include a ProSe slice identifier included in the AN parameters. The ProSe slice identifier may include ProSe network slice selection assistance information (PS-NSSAI). For example, the ProSe registration circuitry 644, together with the communication and processing circuitry 642 and transceiver 610, shown and described above in connection with FIG. 6 may provide a means to transmit the AN message including the registration request and ProSe indication to the RAN.

At block 904, the UE may receive a registration accept message including a ProSe supported indication from a core network via the RAN. The ProSe supported indication may indicate to the UE that the UE is authorized to utilize ProSe services in the RAN. In some examples, the registration accept message may further include ProSe policy information. For example, the ProSe registration circuitry 644, together with the communication and processing circuitry 642 and transceiver 610, shown and described above in connection with FIG. 6 may provide a means to receive the registration accept message.

At block 906, the UE may initiate a ProSe session with another UE based on the ProSe supported indication within the registration accept message. In some examples, the UE may be configured to initiate and establish a ProSe session based on the ProSe policy information included in the registration accept message. In some examples, the ProSe session may be established over a ProSe PC5 interface. For example, the ProSe session establishment circuitry 646, shown and described above in connection with FIG. 6 may provide a means to initiate the ProSe session.

In one configuration, the UE 600 includes means for facilitating ProSe authorization and provisioning as described in the present disclosure. In one aspect, the aforementioned means may be the processor 604 shown in FIG. 6 configured to perform the functions recited by the aforementioned means. In another aspect, the aforementioned means may be a circuit or any apparatus configured to perform the functions recited by the aforementioned means.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1-5, and utilizing, for example, the processes and/or algorithms described herein in relation to FIG. 9.

Figure 10:
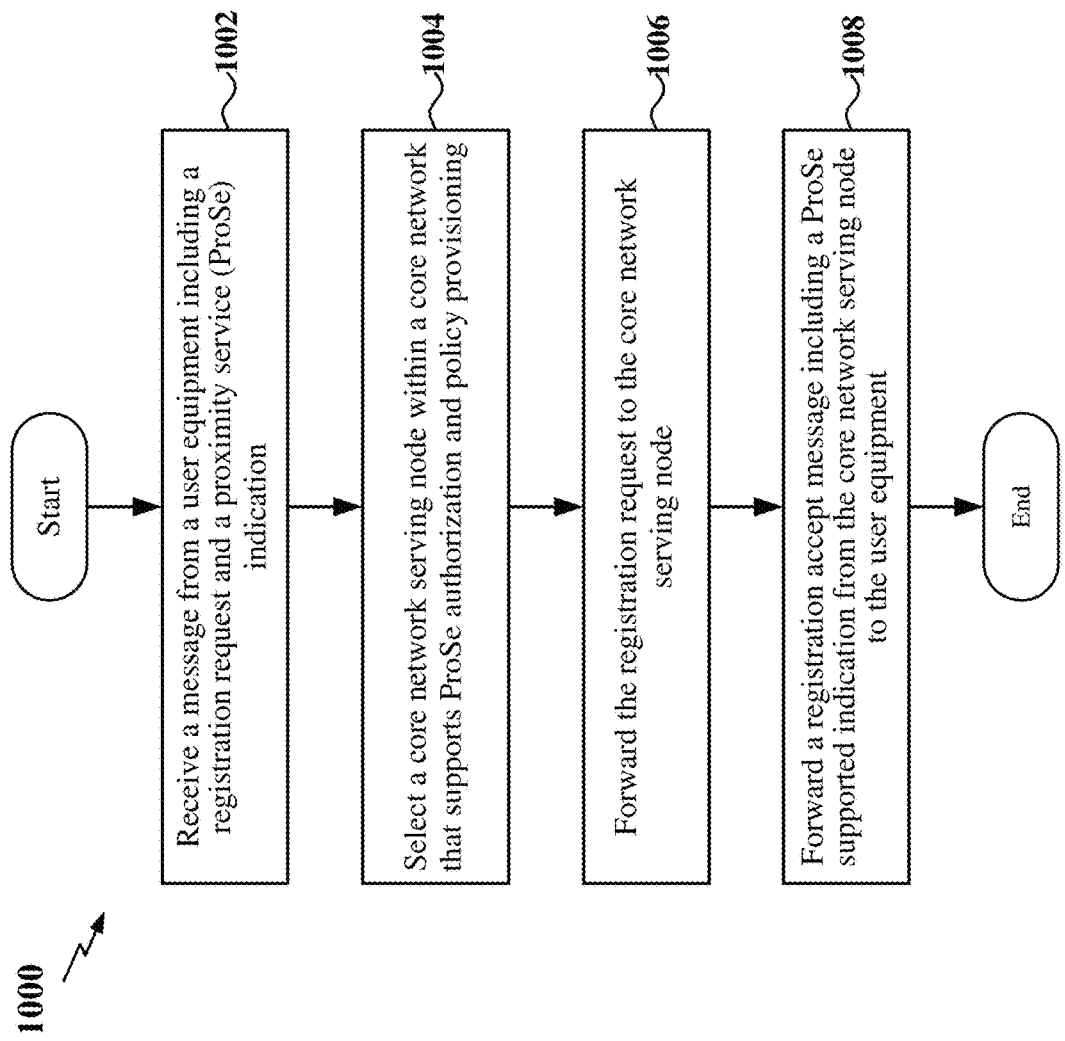
FIG. 10 is a flow chart of an exemplary method for facilitating ProSe authorization and provisioning at a base station according to some aspects.

FIG. 10 is a flow chart 1000 of a method for facilitating ProSe authorization and provisioning at a base station according to some aspects. As described below, some or all illustrated features may be omitted in a particular implementation within the scope of the present disclosure, and some illustrated features may not be required for implementation of all embodiments. In some examples, the method may be performed by the base station 700, as described above and illustrated in FIG. 7, by a processor or processing system, or by any suitable means for carrying out the described functions.

At block 1002, the base station may receive a message (e.g., an AN message) from a UE including a registration request and a proximity service (ProSe) indication. The ProSe indication indicates to the base station that the UE is configured to support ProSe communication for proximity use services. In some examples, the registration request includes the ProSe indication. In some examples, the message further includes AN parameters including the ProSe indication. For example, the ProSe indication may include a ProSe capability indication included in the AN parameters. As another example, the ProSe indication may include a ProSe slice identifier included in the AN parameters. The ProSe slice identifier may include ProSe network slice selection assistance information (PS-NSSAI). For example, the ProSe registration circuitry 746, together with the communication and processing circuitry 744 and transceiver 710, shown and described above in connection with FIG. 7 may provide a means to receive the AN message including the registration request and the ProSe indication.

At block 1004, the base station may select a core network serving node within a core network that supports ProSe authorization and policy provisioning. In some examples, the base station may select a standard AMF within the core network that supports ProSe authorization and policy provisioning based on the ProSe slice identifier included in the AN message. In other examples, the base station may select a ProSe-specific AMF that is configured for ProSe registration and supports ProSe service access authorization functionality. For example, the ProSe registration circuitry 746, shown and described above in connection with FIG. 7 may provide a means to select the core network serving node.

At block 1006, the base station may forward the registration request to the selected core network serving node. For example, the ProSe registration circuitry 746, together with the communication and processing circuitry 744 and transceiver 710, shown and described above in connection with FIG. 7 may provide a means to forward the registration request to the selected core network serving node.

At block 1008, the base station may forward a registration accept message from the core network serving node to the user equipment. The registration accept message may include a ProSe supported indication that indicates to the UE that the UE is authorized to utilize ProSe services. For example, the ProSe registration circuitry 746, together with the communication and processing circuitry 744 and transceiver 710, shown and described above in connection with FIG. 7 may provide a means to forward the registration accept message from the core network serving node to the user equipment.

Figure 11:
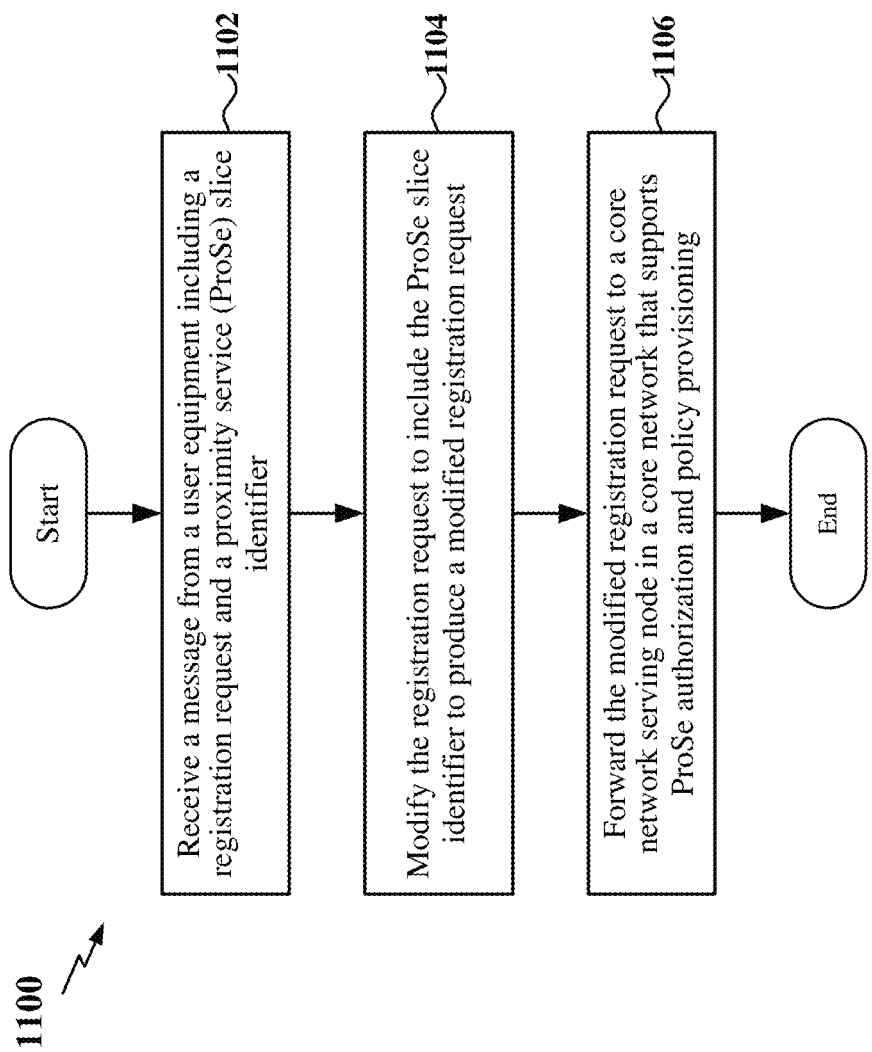
FIG. 11 is a flow chart of another exemplary method for facilitating ProSe authorization and provisioning at a base station according to some aspects.

FIG. 11 is a flow chart 1100 of a method for facilitating ProSe authorization and provisioning at a base station according to some aspects. As described below, some or all illustrated features may be omitted in a particular implementation within the scope of the present disclosure, and some illustrated features may not be required for implementation of all embodiments. In some examples, the method may be performed by the base station 700, as described above and illustrated in FIG. 7, by a processor or processing system, or by any suitable means for carrying out the described functions.

At block 1102, the base station may receive a message (e.g., an AN message) from a UE including a registration request and a proximity service (ProSe) slice identifier. The ProSe slice identifier indicates to the base station that the UE is configured to support ProSe communication for proximity use services. In some examples, the ProSe slice identifier is included in AN parameters within the message. For example, the ProSe slice identifier may include ProSe network slice selection assistance information (PS-NSSAI). For example, the ProSe registration circuitry 746, together with the communication and processing circuitry 744 and transceiver 710, shown and described above in connection with FIG. 7 may provide a means to receive the AN message including the registration request and the ProSe slice identifier.

At block 1104, the base station may modify the registration request to include the ProSe slice identifier to produce a modified registration request. For example, the ProSe registration circuitry 746, shown and described above in connection with FIG. 7 may provide a means to modify the registration request.

At block 1106, the base station may forward the modified registration request including the ProSe slice identifier to a selected core network serving node in a core network that supports ProSe authorization and policy provisioning. For example, the ProSe registration circuitry 746, together with the communication and processing circuitry 744 and transceiver 710, shown and described above in connection with FIG. 7 may provide a means to forward the modified registration request to the core network serving node.

In one configuration, the base station 700 includes means for facilitating ProSe authorization and provisioning as described in the present disclosure. In one aspect, the aforementioned means may be the processor 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1-5, and utilizing, for example, the processes and/or algorithms described herein in relation to FIGS. 10 and 11.

Figure 12:
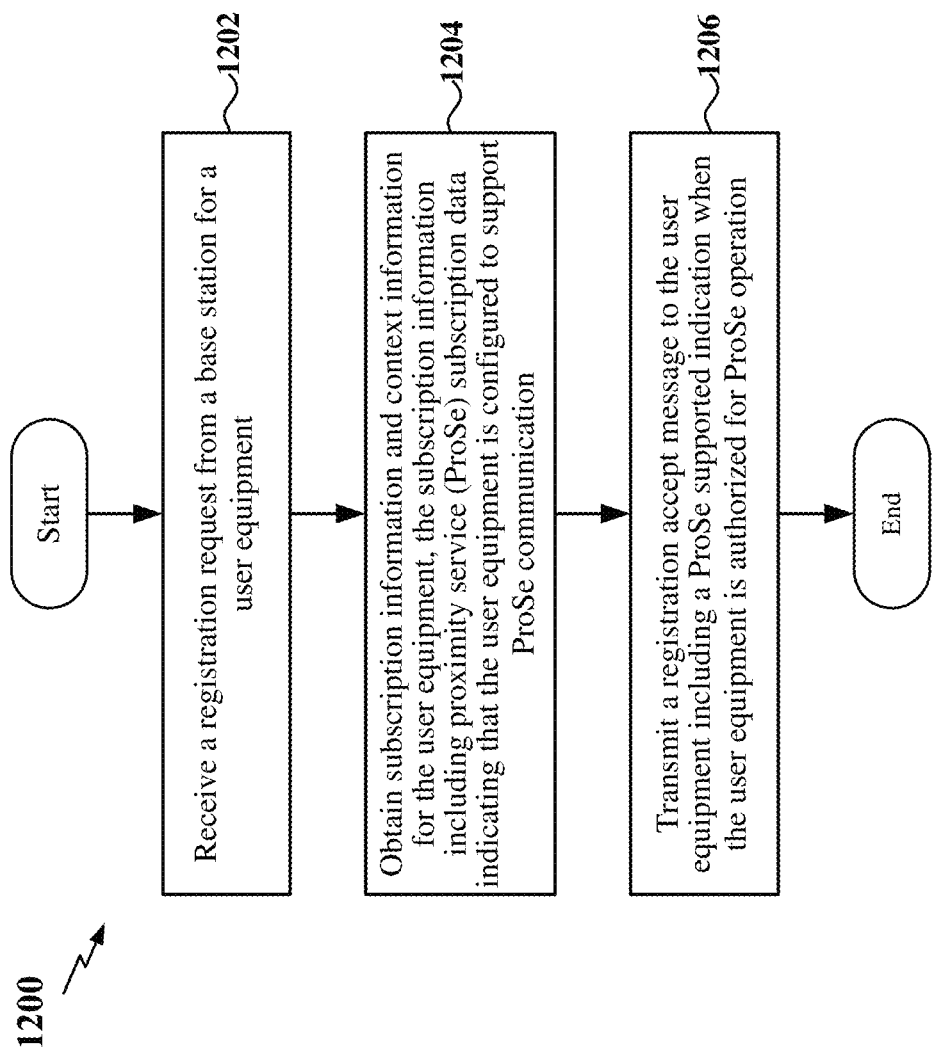
FIG. 12 is a flow chart of an exemplary method for facilitating ProSe authorization provisioning at a core network serving node according to some aspects.

FIG. 12 is a flow chart 1200 of a method for facilitating wireless communication at a core network serving node within a core network. As described below, some or all illustrated features may be omitted in a particular implementation within the scope of the present disclosure, and some illustrated features may not be required for implementation of all embodiments. In some examples, the method may be performed by the core network serving node 800, as described above and illustrated in FIG. 8, by a processor or processing system, or by any suitable means for carrying out the described functions.

At block 1202, the core network serving node may receive a registration request from a base station for a UE. In some examples, the registration request includes ProSe indication indicating that the user equipment supports ProSe communication. In other examples, the registration request includes a ProSe slice identifier indicating that the user equipment supports ProSe communication. In some examples, the ProSe slice identifier may include ProSe network slice selection assistance information (PS-NSSAI) that indicates to the core network serving node that the UE is configured to support ProSe communication. In some examples, the core network serving node may include a standard AMF within the core network that supports ProSe authorization and policy provisioning. In other examples, the core network serving node may include a ProSe-specific AMF that is configured for ProSe registration and supports ProSe service access authorization functionality. For example, the ProSe registration circuitry 844, together with the communication and processing circuitry 842 and interface 810, shown and described above in connection with FIG. 8, may provide a means to receive the registration request.

At block 1204, the core network serving node may obtain subscription information and context information (e.g., UE context) for the UE (e.g., from the UDM and/or old AMF in the core network). The subscription information may include proximity service (ProSe) subscription data indicating that the user equipment is configured to support ProSe communication. For example, the ProSe registration circuitry 844, together with the communication and processing circuitry 842 and interface 810, shown and described above in connection with FIG. 8 may provide a means to obtain the subscription information and the context information for the user equipment.

At block 1206, the core network serving node may transmit a registration accept message to the UE including a ProSe supported indication when the UE is authorized for ProSe operation. For example, the ProSe registration circuitry 844, together with the communication and processing circuitry 842, ProSe authorization circuitry 846, and interface 810, shown and described above in connection with FIG. 8 may provide a means to transmit the registration accept message including the ProSe supported indication to the UE.

Figure 13:
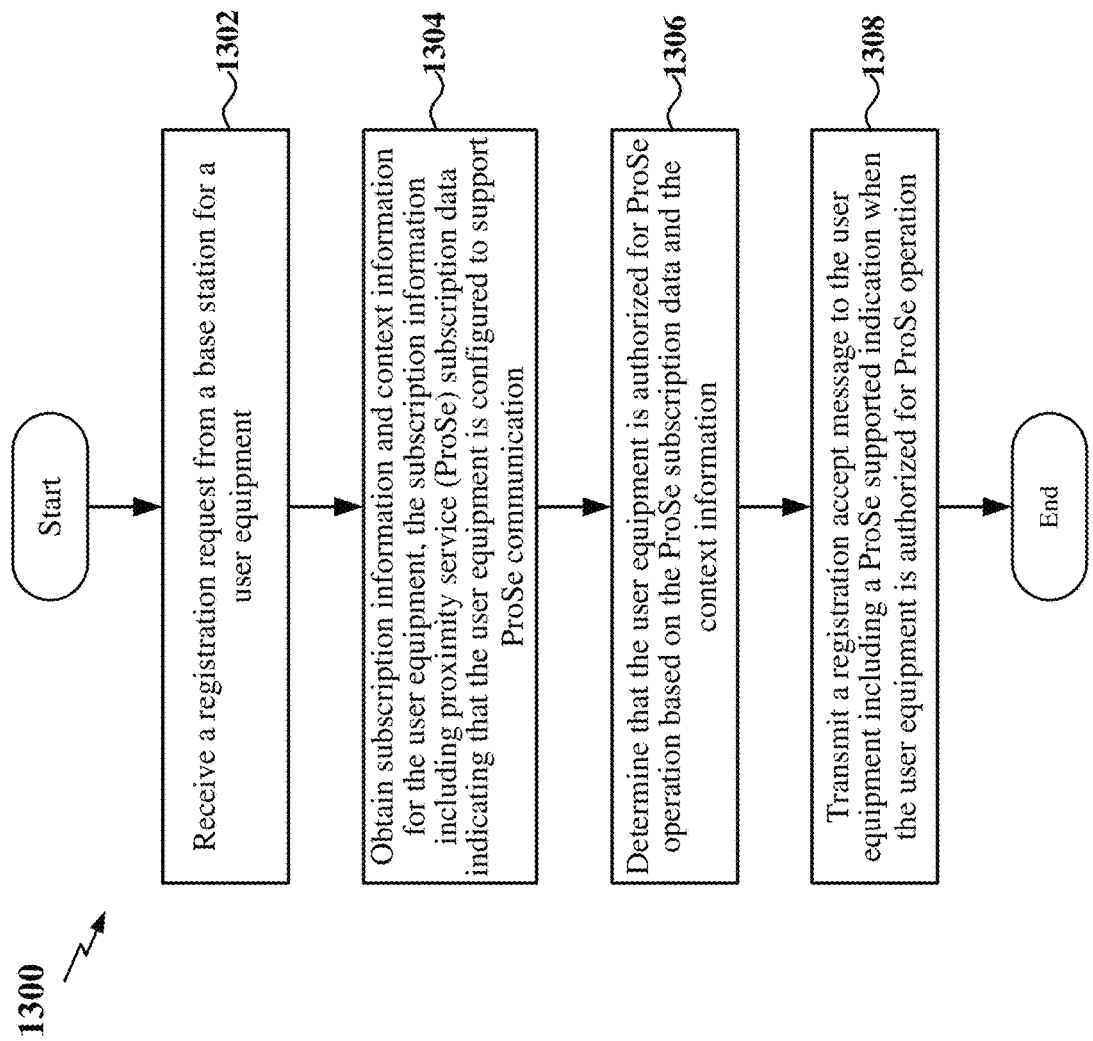
FIG. 13 is a flow chart of another exemplary method for facilitating ProSe authorization and provisioning at a core network serving node according to some aspects.

FIG. 13 is a flow chart 1300 of a method for facilitating wireless communication at a core network serving node within a core network. As described below, some or all illustrated features may be omitted in a particular implementation within the scope of the present disclosure, and some illustrated features may not be required for implementation of all embodiments. In some examples, the method may be performed by the core network serving node 800, as described above and illustrated in FIG. 8, by a processor or processing system, or by any suitable means for carrying out the described functions.

At block 1302, the core network serving node may receive a registration request from a base station for a UE. In some examples, the registration request includes ProSe indication indicating that the user equipment supports ProSe communication. In other examples, the registration request includes a ProSe slice identifier indicating that the user equipment supports ProSe communication. In some examples, the ProSe slice identifier may include ProSe network slice selection assistance information (PS-NSSAI) that indicates to the core network serving node that the UE is configured to support ProSe communication. In some examples, the core network serving node may include a standard AMF within the core network that supports ProSe authorization and policy provisioning. In other examples, the core network serving node may include a ProSe-specific AMF that is configured for ProSe registration and supports ProSe service access authorization functionality. For example, the ProSe registration circuitry 844, together with the communication and processing circuitry 842 and interface 810, shown and described above in connection with FIG. 8, may provide a means to receive the registration request.

At block 1304, the core network serving node may obtain subscription information and context information (e.g., UE context) for the UE (e.g., from the UDM and/or old AMF in the core network). The subscription information may include proximity service (ProSe) subscription data indicating that the user equipment is configured to support ProSe communication. For example, the ProSe registration circuitry 844, together with the communication and processing circuitry 842 and interface 810, shown and described above in connection with FIG. 8 may provide a means to obtain the subscription information and the context information for the user equipment.

At block 1306, the core network serving node may determine that the user equipment is authorized for ProSe operation based on the ProSe subscription data and the context information. For example, the ProSe authorization circuitry 846 shown and described above in connection with FIG. 8 may provide a means to determine that the UE is authorized for ProSe operation.

At block 1308, the core network serving node may transmit a registration accept message to the UE including a ProSe supported indication when the UE is authorized for ProSe operation. For example, the ProSe registration circuitry 844, together with the communication and processing circuitry 842 and interface 810, shown and described above in connection with FIG. 8 may provide a means to transmit the registration accept message including the ProSe supported indication to the UE.

Figure 14:
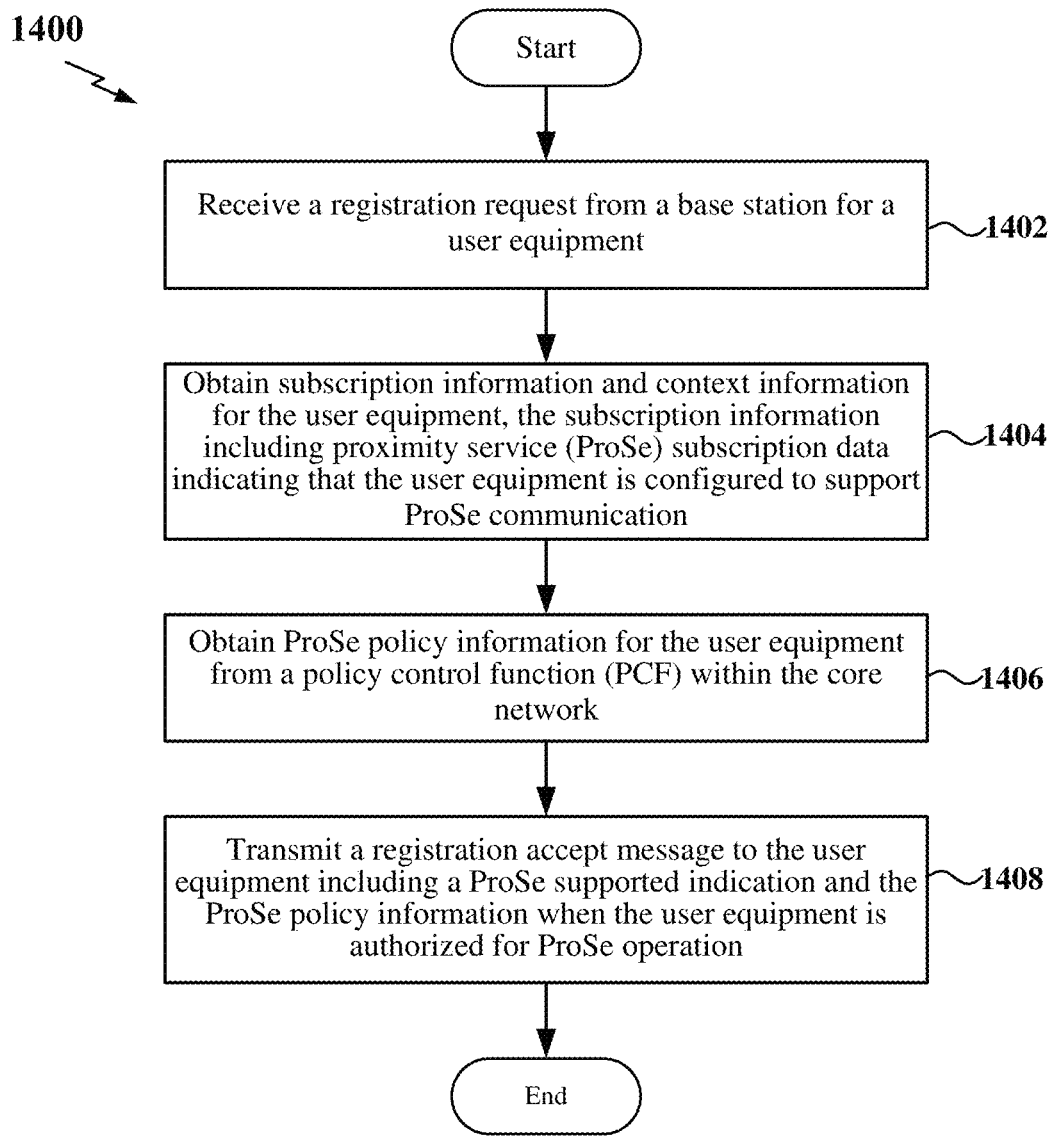
FIG. 14 is a flow chart of another exemplary method for facilitating ProSe authorization and provisioning at a core network serving node according to some aspects.

FIG. 14 is a flow chart 1400 of a method for facilitating wireless communication at a core network serving node within a core network. As described below, some or all illustrated features may be omitted in a particular implementation within the scope of the present disclosure, and some illustrated features may not be required for implementation of all embodiments. In some examples, the method may be performed by the core network serving node 800, as described above and illustrated in FIG. 8, by a processor or processing system, or by any suitable means for carrying out the described functions.

At block 1402, the core network serving node may receive a registration request from a base station for a UE. In some examples, the registration request includes ProSe indication indicating that the user equipment supports ProSe communication. In other examples, the registration request includes a ProSe slice identifier indicating that the user equipment supports ProSe communication. In some examples, the ProSe slice identifier may include ProSe network slice selection assistance information (PS-NSSAI) that indicates to the core network serving node that the UE is configured to support ProSe communication. In some examples, the core network serving node may include a standard AMF within the core network that supports ProSe authorization and policy provisioning. In other examples, the core network serving node may include a ProSe-specific AMF that is configured for ProSe registration and supports ProSe service access authorization functionality. For example, the ProSe registration circuitry 844, together with the communication and processing circuitry 842 and interface 810, shown and described above in connection with FIG. 8, may provide a means to receive the registration request.

At block 1404, the core network serving node may obtain subscription information and context information (e.g., UE context) for the UE (e.g., from the UDM and/or old AMF in the core network). The subscription information may include proximity service (ProSe) subscription data indicating that the user equipment is configured to support ProSe communication. For example, the ProSe registration circuitry 844, together with the communication and processing circuitry 842 and interface 810, shown and described above in connection with FIG. 8 may provide a means to obtain the subscription information and the context information for the user equipment.

At block 1406, the core network serving node may obtain ProSe policy information for the user equipment from a policy control function (PCF) within the core network. The ProSe policy information may include, for example, in-coverage ProSe policy information, out-of-coverage ProSe policy information, and/or partial coverage ProSe policy information. For example, the ProSe authorization circuitry 846, together with the ProSe policy association circuitry 848, shown and described above in connection with FIG. 8 may provide a means to obtain ProSe policy information for the user equipment.

At block 1408, the core network serving node may transmit a registration accept message to the UE including a ProSe supported indication and the ProSe policy information when the UE is authorized for ProSe operation. For example, the ProSe registration circuitry 844, together with the communication and processing circuitry 842, ProSe authorization circuitry 846, ProSe policy association circuitry 848 and interface 810, shown and described above in connection with FIG. 8 may transmit the registration accept message including the ProSe supported indication and the ProSe policy information to the UE.

In one configuration, the core network serving node 800 includes means for facilitating ProSe authorization and provisioning as described in the present disclosure. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS.

1-5, and utilizing, for example, the processes and/or algorithms described herein in relation to FIGS. 12-14.

The following provides an overview of examples of the present disclosure.

EXAMPLE 1

A method for wireless communication at a user equipment, the method comprising: transmitting a message to a radio access network, the message comprising a registration request and a proximity service (ProSe) indication, wherein the ProSe indication indicates to the radio access network and a core network serving the radio access network that the user equipment is configured to support ProSe communication; receiving a registration accept message from the core network via the radio access network, wherein the registration accept message comprises a ProSe supported indication; and initiating a ProSe session between the user equipment and another user equipment based on the ProSe supported indication within the registration accept message.

EXAMPLE 2

The method of example 1, wherein the registration accept message further comprises ProSe policy information.

EXAMPLE 3

The method of example 1 or 2, wherein the initiating the ProSe session further comprises: initiating the ProSe session based on the ProSe policy information.

EXAMPLE 4

The method of any of examples 1 through 3, wherein the registration request comprises the ProSe indication.

EXAMPLE 5

The method of any of examples 1 through 3, wherein the message further comprises access network parameters comprising the ProSe indication.

EXAMPLE 6

The method of example 5, wherein the ProSe indication comprises a ProSe slice identifier.

EXAMPLE 7

The method of example 6, wherein the ProSe slice identifier comprises ProSe network slice selection assistance information.

EXAMPLE 8

The method of example 5, wherein the ProSe indication comprises a ProSe capability indication.

EXAMPLE 9

The method of any of examples 1 through 8, wherein the initiating the ProSe session further comprises: establishing the ProSe session over a ProSe PC5 interface.

EXAMPLE 10

A user equipment (UE) in a wireless communication network, the UE comprising a transceiver configured to communicate with a radio access network, a memory, and a processor coupled to the transceiver and the memory, the processor and memory configured to perform a method of any one of examples 1 through 9.

EXAMPLE 11

An apparatus configured for wireless communication comprising at least one means for performing a method of any one of examples 1 through 9.

EXAMPLE 12

A non-transitory computer-readable medium storing computer-executable code, comprising code for causing an apparatus to perform a method of any one of examples 1 through 9.

EXAMPLE 13

A method for wireless communication at a base station, the method comprising: receiving a message from a user equipment, the message comprising a registration request and a proximity service (ProSe) indication, wherein the ProSe indication indicates to the base station that the user equipment is configured to support ProSe communication; selecting a core network serving node within a core network that supports ProSe authorization and policy provisioning; forwarding the registration request to the core network serving node; and forwarding a registration accept message from the core network serving node to the user equipment, wherein the registration accept message comprises a ProSe supported indication.

EXAMPLE 14

The method of example 13, wherein the core network serving node comprises an access and mobility management function within the core network.

EXAMPLE 15

The method of example 13, wherein the core network serving node comprises a ProSe access and mobility management function within the core network configured to support ProSe registration and ProSe service access authorization functionality.

EXAMPLE 16

The method of any of examples 13 through 15, wherein the registration request comprises the ProSe indication.

EXAMPLE 17

The method of any of examples 13 through 15, wherein the message further comprises access network parameters comprising the ProSe indication.

EXAMPLE 18

The method of example 17, wherein the ProSe indication comprises a ProSe slice identifier.

EXAMPLE 19

The method of example 18, wherein the forwarding the registration request to the core network serving node comprises: modifying the registration request to include the ProSe slice identifier to produce a modified registration request; and forwarding the modified registration request to the core network serving node.

EXAMPLE 20

A base station in a wireless communication network, the base station comprising a transceiver, a memory, and a processor coupled to the transceiver and the memory, the processor and memory configured to perform a method of any one of examples 13 through 19.

EXAMPLE 21

An apparatus configured for wireless communication comprising at least one means for performing a method of any one of examples 13 through 19.

EXAMPLE 22

A non-transitory computer-readable medium storing computer-executable code, comprising code for causing an apparatus to perform a method of any one of examples 13 through 19.

EXAMPLE 23

A method for facilitating wireless communication at a core network serving node within a core network, the method comprising: receiving a registration request from a base station for a user equipment; obtaining subscription information and context information for the user equipment, the subscription information including proximity service (ProSe) subscription data indicating that the user equipment is configured to support ProSe communication; and transmitting a registration accept message to the user equipment, wherein the registration accept message comprises a ProSe supported indication when the user equipment is authorized for ProSe operation.

EXAMPLE 24

The method of example 23, further comprising: determining that the user equipment is authorized for ProSe operation based on the ProSe subscription data and the context information.

EXAMPLE 25

The method of example 23 or 24, wherein the registration accept message further comprises ProSe policy information.

EXAMPLE 26

The method of example 25, wherein the ProSe policy information comprises at least one of in-coverage ProSe policy information, out-of-coverage ProSe policy information, or partial coverage ProSe policy information.

EXAMPLE 27

The method of example 25 or 26, further comprising: obtaining the ProSe policy information for the user equipment from a policy control function (PCF) within the core network; and including the ProSe policy information within the registration accept message.

EXAMPLE 28

The method of any of examples 23 through 27, wherein the core network serving node comprises an access and mobility management function within the core network.

EXAMPLE 29

The method of any of examples 23 through 27, wherein the core network serving node comprises a ProSe access and mobility management function within the core network configured to support ProSe registration and ProSe service access authorization functionality.

EXAMPLE 30

The method of any of examples 23 through 29, wherein the registration request comprises a ProSe indication indicating that the user equipment supports ProSe communication.

EXAMPLE 31

The method of any of examples 23 through 29, wherein the registration request comprise a ProSe slice identifier indicating that the user equipment supports ProSe communication.

EXAMPLE 32

A core network serving node in a core network, the core network serving node comprising an interface, a memory, and a processor coupled to the transceiver and the memory, the processor and memory configured to perform a method of any one of examples 23 through 31.

EXAMPLE 33

An apparatus in a core network comprising at least one means for performing a method of any one of examples 23 through 31.

EXAMPLE 34

A non-transitory computer-readable medium storing computer-executable code, comprising code for causing an apparatus to perform a method of any one of examples 23 through 31.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment, the method comprising:
   transmitting a message to a radio access network, the message comprising a registration request and a proximity service (ProSe) indication, wherein the ProSe indication indicates to the radio access network and a core network serving the radio access network that the user equipment is configured to support ProSe communication;
   receiving a registration accept message from the core network via the radio access network, wherein the registration accept message comprises a ProSe supported indication and ProSe policy information, the ProSe policy information comprising at least one of in-coverage ProSe policy information, out-of-coverage ProSe policy information, or partial coverage ProSe policy information; and
   initiating a ProSe session between the user equipment and another user equipment based on the ProSe supported indication within the registration accept message.

2. The method of claim 1, wherein the initiating the ProSe session further comprises:
   initiating the ProSe session based on the ProSe policy information.

3. The method of claim 1, wherein the registration request comprises the ProSe indication.

4. The method of claim 1, wherein the message further comprises access network parameters comprising the ProSe indication.

5. The method of claim 4, wherein the ProSe indication comprises a ProSe slice identifier.

6. The method of claim 5, wherein the ProSe slice identifier comprises ProSe network slice selection assistance information.

7. The method of claim 4, wherein the ProSe indication comprises a ProSe capability indication.

8. The method of claim 1, wherein the initiating the ProSe session further comprises:
   establishing the ProSe session over a ProSe PC5 interface.

9. A user equipment (UE) within a wireless communication network, comprising:
   a transceiver configured to communicate with a radio access network;
   a memory; and
   a processor coupled to the transceiver and the memory, wherein the processor and the memory are configured to:
      transmit a message to the radio access network via the transceiver, the message comprising a registration request and a proximity service (ProSe) indication, wherein the ProSe indication indicates to the radio access network and a core network serving the radio access network that the user equipment is configured to support ProSe communication;
      receive a registration accept message from the core network via the radio access network and the transceiver, wherein the registration accept message comprises a ProSe supported indication and ProSe policy information, the ProSe policy information comprising at least one of in-coverage ProSe policy information, out-of-coverage ProSe policy information, or partial coverage ProSe policy information; and
      initiate a ProSe session between the user equipment and another user equipment based on the ProSe supported indication within the registration accept message.

10. The UE of claim 9, wherein the processor and the memory are further configured to:
    initiate the ProSe session based on the ProSe policy information.

11. The UE of claim 9, wherein the registration request comprises the ProSe indication.

12. The UE of claim 9, wherein the message further comprises access network parameters comprising the ProSe indication.

13. The UE of claim 12, wherein the ProSe indication comprises a ProSe slice identifier.

14. A method for wireless communication at a network element, the method comprising:
    receiving a message from a user equipment, the message comprising a registration request and a proximity service (ProSe) indication, wherein the ProSe indication indicates to the base station that the user equipment is configured to support ProSe communication;
    selecting a core network serving node within a core network that supports ProSe authorization and policy provisioning;
    forwarding the registration request to the core network serving node; and
    forwarding a registration accept message from the core network serving node to the user equipment, wherein the registration accept message comprises a ProSe supported indication and ProSe policy information, the ProSe policy information comprising at least one of in-coverage ProSe policy information, out-of-coverage ProSe policy information, or partial coverage ProSe policy information.

15. The method of claim 14, wherein the core network serving node comprises an access and mobility management function within the core network.

16. The method of claim 14, wherein the core network serving node comprises a ProSe access and mobility management function within the core network configured to support ProSe registration and ProSe service access authorization functionality.

17. The method of claim 14, wherein the registration request comprises the ProSe indication.

18. The method of claim 14, wherein the message further comprises access network parameters comprising the ProSe indication.

19. The method of claim 18, wherein the ProSe indication comprises a ProSe slice identifier.

20. The method of claim 19, wherein the forwarding the registration request to the core network serving node comprises:
    modifying the registration request to include the ProSe slice identifier to produce a modified registration request; and
    forwarding the modified registration request to the core network serving node.

21. A method for facilitating wireless communication at a core network serving node within a core network, the method comprising:
    receiving a registration request from a network element for a user equipment;
    obtaining subscription information and context information for the user equipment, the subscription information including proximity service (ProSe) subscription data indicating that the user equipment is configured to support ProSe communication; and transmitting a registration accept message to the user equipment, wherein the registration accept message comprises a ProSe supported indication when the user equipment is authorized for ProSe operation and ProSe policy information, the ProSe policy information comprising at least one of in-coverage ProSe policy information, out-of-coverage ProSe policy information, or partial coverage ProSe policy information.

22. The method of claim 21, further comprising:

determining that the user equipment is authorized for ProSe operation based on the ProSe subscription data and the context information.

23. The method of claim 21, further comprising:

obtaining the ProSe policy information for the user equipment from a policy control function (PCF) within the core network; and including the ProSe policy information within the registration accept message.

24. The method of claim 21, wherein the core network serving node comprises an access and mobility management function within the core network.

25. The method of claim 21, wherein the core network serving node comprises a ProSe access and mobility management function within the core network configured to support ProSe registration and ProSe service access authorization functionality.

26. The method of claim 21, wherein the registration request comprises a ProSe indication indicating that the user equipment supports ProSe communication.

27. The method of claim 21, wherein the registration request comprise a ProSe slice identifier indicating that the user equipment supports ProSe communication.

* * * * *